(12) United States Patent
Tanaka et al.

(10) Patent No.: US 10,572,930 B2
(45) Date of Patent: Feb. 25, 2020

(54) INFORMATION COMMUNICATION TERMINAL, INFORMATION DISTRIBUTION APPARATUS, INFORMATION DISTRIBUTION SYSTEM, CONTENT MANAGEMENT METHOD, BROADCAST RECEPTION METHOD, INFORMATION DISTRIBUTION METHOD, PROGRAMS AND STORAGE MEDIUM

(71) Applicant: SONY CORPORATION, Tokyo (JP)

(72) Inventors: Izuru Tanaka, Tokyo (JP); Hiraku Inoue, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/147,567

(22) Filed: Sep. 28, 2018

(65) Prior Publication Data

US 2019/0035001 A1   Jan. 31, 2019

Related U.S. Application Data

(63) Continuation of application No. 15/697,009, filed on Sep. 6, 2017, now Pat. No. 10,115,147, which is a
(Continued)

(30) Foreign Application Priority Data

May 8, 2002   (JP) ................................ 2002-132469

(51) Int. Cl.
  *G06Q 30/06* (2012.01)
  *G06F 16/48* (2019.01)
  (Continued)

(52) U.S. Cl.
  CPC ....... *G06Q 30/0633* (2013.01); *G06F 16/433* (2019.01); *G06F 16/4387* (2019.01);
  (Continued)

(58) Field of Classification Search
  None
  See application file for complete search history.

(56) References Cited

U.S. PATENT DOCUMENTS

| 5,963,916 A | 10/1999 | Kaplan |
| 5,991,737 A | 11/1999 | Chen |

(Continued)

FOREIGN PATENT DOCUMENTS

| DE | 25 23 653 | 12/1976 |
| DE | 40 11 134 | 2/1991 |

(Continued)

OTHER PUBLICATIONS

European Summons to attend oral proceedings pursuant to Rule 115(1) EPC issued Dec. 8, 2011 in patent application No. 08003439.0.

(Continued)

*Primary Examiner* — Shripal K Khajuria
(74) *Attorney, Agent, or Firm* — Xsensus LLP

(57) ABSTRACT

A method for providing purchased content is provided. Management data including the identification data of the purchased content data stored in the information processing apparatus is received. Backup data of a user identification associated with the information processing apparatus is updated based on the management data. A request with the user identification associated with the information processing apparatus is received. A determination is made as to whether the request is authorized based on an authentication process. A list of identification data of content data identified in the backup data is provided to the information processing apparatus in response to a determination that the request is authorized. Further, the purchased content data without the fee is provided to the information processing apparatus based on a user selection of the identification data of the (Continued)

purchased content data from the list of the identification data of the content data.

20 Claims, 24 Drawing Sheets

Related U.S. Application Data continuation of application No. 15/058,546, filed on Mar. 2, 2016, now Pat. No. 9,792,642, which is a continuation of application No. 14/178,737, filed on Feb. 12, 2014, now Pat. No. 9,317,880, which is a continuation of application No. 13/285,878, filed on Oct. 31, 2011, now Pat. No. 8,700,741, which is a continuation of application No. 10/512,164, filed as application No. PCT/JP03/05761 on May 8, 2003, now Pat. No. 8,255,488.

(51) Int. Cl.
*G06F 16/68* (2019.01)
*G06F 16/432* (2019.01)
*G06F 16/438* (2019.01)
*G06Q 30/02* (2012.01)
*G11B 20/00* (2006.01)
*H04L 29/06* (2006.01)

(52) U.S. Cl.
CPC .............. *G06F 16/48* (2019.01); *G06F 16/68* (2019.01); *G06Q 30/02* (2013.01); *G11B 20/00086* (2013.01); *H04L 65/4069* (2013.01)

(56) References Cited

U.S. PATENT DOCUMENTS

| | | | |
|---|---|---|---|
| 6,651,053 | B1 | 11/2003 | Rothschild |
| 6,891,953 | B1* | 5/2005 | DeMello ................. G06F 21/10 380/259 |
| 7,209,900 | B2 | 4/2007 | Hunter et al. |
| 7,788,211 | B2 | 8/2010 | Le et al. |
| 2002/0002039 | A1 | 1/2002 | Qureshey et al. |
| 2002/0049037 | A1* | 4/2002 | Christensen ....... G06Q 30/0267 455/3.06 |
| 2002/0065564 | A1* | 5/2002 | Sheriff .................... H04L 67/16 700/11 |
| 2002/0065732 | A1* | 5/2002 | Rodgers ............. G06Q 30/0207 705/14.1 |

FOREIGN PATENT DOCUMENTS

| | | |
|---|---|---|
| DE | 197 57 129 | 6/1999 |
| EP | 0 945 865 | 9/1999 |
| EP | 0 969 469 | 1/2000 |
| FR | 2 602 352 | 2/1988 |
| FR | 2 739 715 | 4/1997 |
| GB | 2 353 135 | 2/2001 |
| GB | 2 358 952 | 8/2001 |
| JP | 2000-285057 | 10/2000 |
| JP | 2001-148156 | 5/2001 |
| JP | 2001-236394 | 8/2001 |
| JP | 2001-265979 | 9/2001 |
| JP | 2001-290585 | 10/2001 |
| JP | 2001-290895 | 10/2001 |
| JP | 2001-357052 | 12/2001 |
| JP | 2002-025184 | 1/2002 |
| JP | 2002-041527 | 2/2002 |
| JP | 2002-123270 | 4/2002 |
| JP | 2002-124028 | 4/2002 |
| NL | 1 006 594 | 1/1999 |
| WO | WO 00/54231 | 9/2000 |
| WO | WO 01/33849 | 5/2001 |
| WO | WO 02/09112 | 1/2002 |
| WO | WO 2008943 | 1/2008 |

OTHER PUBLICATIONS

European Summons to attend oral proceedings pursuant to Rule 115(1) EPC issued Dec. 8, 2011 in patent application No. 08003438.2.

European Summons to attend oral proceedings pursuant to Rule 115(1) EPC issued Dec. 8, 2011 in patent application No. 08003440.8.

European Summons to attend oral proceedings pursuant to Rule 115(1) EPC issued Dec. 8, 2011 in patent application No. 03725763.1.

Hideki Sakamoto, et al, "clDf Specifications Ver. 1.1: Response to CfP for an RDD-REL", International Organization for Standardization, ISO/IEC JTC1/SC29/WG11, Pattaya, XP030036721, Dec. 2001, pp. 1-17.

Decision to refuse issued Apr. 2, 2012, in European Patent Application No. 08 003 438.2.

Decision to refuse issued Apr. 2, 2012, in European Patent Application No. 08 003 439.0.

Decision to refuse issued Apr. 2, 2012, in European Patent Application No. 08 003 440.8.

Decision to refuse issued Apr. 2, 2012, in European Patent Application No. 03 725 763.1.

* cited by examiner

| CD IDENTIFIER | CD-TITLE INFORMATION |
|---|---|
| #1 | ××××× | ⋯⋯ |
| #2 | △△××○○ | ⋯⋯ |
| #3 | ×○×○○○ | ⋯⋯ |
| #4 | ○○○△△× | ⋯⋯ |
| #5 | ××××○○ | ⋯⋯ |
| ⋯⋯ | ⋯⋯ | ⋯⋯ |

| CD IDENTIFIER | CONTENT ID |
|---|---|
| #1 | ××××× | ⋯⋯ |
| #2 | △△××○○ | ⋯⋯ |
| #3 | ×○×○○○ | ⋯⋯ |
| #4 | ○○○△△× | ⋯⋯ |
| #5 | ××××○○ | ⋯⋯ |
| ⋯⋯ | ⋯⋯ | ⋯⋯ |

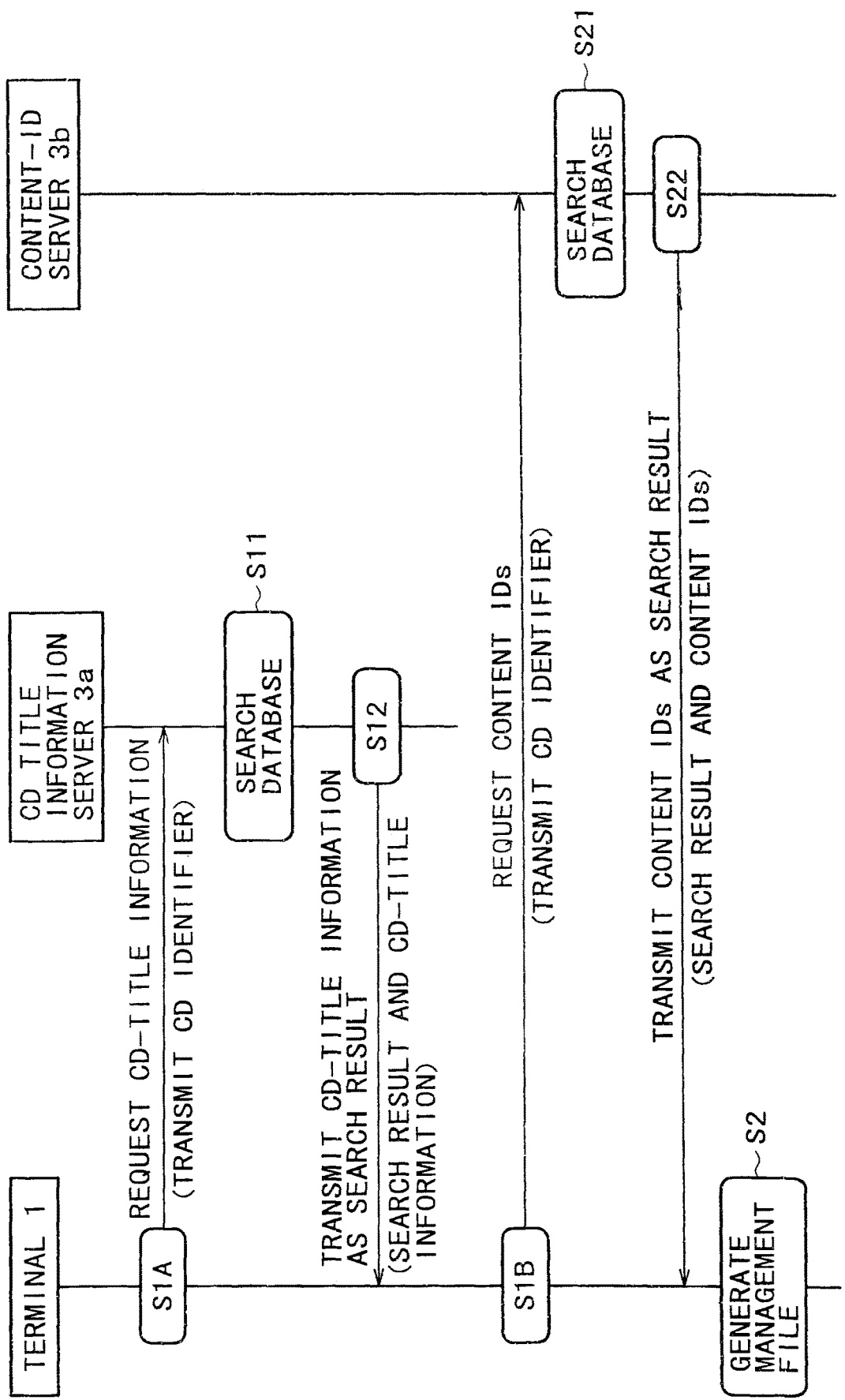

FIG. 14A

| | SONG LIST IDENTIFIER | SONG-LIST TITLE INFORMATION / CONTENT ID |
|---|---|---|
| #1 | ○-I-○ | ⋯⋯ |
| #2 | △-I-○ | ⋯⋯ |
| #3 | □-I-□ | ⋯⋯ |
| #4 | ×-I-○ | ⋯⋯ |
| #5 | □-I-× | ⋯⋯ |
| ⋯ | | ⋯⋯ |

FIG. 14B

| | CONTENT ID | CONTENT DATA |
|---|---|---|
| #1 | ⋯⋯ | ⋯⋯ |
| #2 | ⋯⋯ | ⋯⋯ |
| #3 | ⋯⋯ | ⋯⋯ |
| #4 | ⋯⋯ | ⋯⋯ |
| #5 | ⋯⋯ | ⋯⋯ |
| ⋯ | | |

FIG. 18

★ 10 SELECTED JAZZ SONGS RECOMMENDED BY THE STORE MANAGER OF A SITE

| TITLE | ARTIST NAME | | |
|---|---|---|---|
| 1. Waltz for daddy | Billy Eva | PURCHASE | TRIAL LISTENING |
| 2. Red Train | John Call | PURCHASE | TRIAL LISTENING |
| 3. Bye bye... | Mill David | PURCHASE | TRIAL LISTENING |
| 4. Lullaby of... | Sarra V | PURCHASE | TRIAL LISTENING |

INFORMATION COMMUNICATION TERMINAL, INFORMATION DISTRIBUTION APPARATUS, INFORMATION DISTRIBUTION SYSTEM, CONTENT MANAGEMENT METHOD, BROADCAST RECEPTION METHOD, INFORMATION DISTRIBUTION METHOD, PROGRAMS AND STORAGE MEDIUM

CROSS-REFERENCE TO RELATED APPLICATIONS

This application is a continuation of U.S. Ser. No. 15/697,009 filed Sep. 6, 2017, which is a continuation of U.S. Ser. No. 15/058,546 filed Mar. 2, 2016 now U.S. Pat. No. 9,792,642, which is a continuation of U.S. Ser. No. 14/178,737 filed Feb. 12, 2014 now U.S. Pat. No. 9,317,880, which is a continuation of U.S. Ser. No. 13/285,878 filed Oct. 31, 2011 now U.S. Pat. No. 8,700,741, which is a continuation of U.S. Ser. No. 10/512,164 filed May 18, 2005 now U.S. Pat. No. 8,255,488, the entire contents of which are incorporated herein by reference. U.S. Ser. No. 10/512,164 is a national stage of PCT/JP03/05761 filed May 8, 2003, and also claims priority under 35 U.S.C. 119 to Japanese Application No. 2002-132469 filed May 8, 2002.

TECHNICAL FIELD

The present invention relates to information communication terminals, information distribution apparatus, information distribution system, content management method, broadcast reception method, information distribution method, programs and storage medium.

BACKGROUND ART

Various kinds of audio visual equipment owned by the user have been becoming popular. That is to say, personal enjoyment of the so-called musical software and the so-called movie software has been becoming popular.

For example, the user owns an audio system for disc storage mediums such as a CD (Compact Disc), an MD (Mini Disc) and a DVD (Digital Versatile Disc). With such an audio system, the user is capable of reproducing contents from a desired CD, MD or DVD that the user purchased as package media or recording selected favorite musical software onto recordable media.

In addition, as audio visual equipment, a recording/reproduction apparatus for storing audio and video data files onto large-capacity media such as a hard disc has been developed.

For example, a content recorded on the package media owned by the user can be recorded by dumping to a storage medium employed in the recording/reproduction apparatus. An example of the package media is a CD, an example of the content is musical software and an example of the storage medium is a hard disc. By using a large-capacity storage medium of the recording/reproduction apparatus, for example, the user is capable of storing all pieces of musical software from a large number of CDs or other package storage media owned by the user in a recording/reproduction system. An example of the large-capacity storage medium is an HDD (hard-disc drive).

By having pieces of musical software recorded in a recording/reproduction system as described above, when the user wants to reproduce a piece of musical software, the user does not have go to all the trouble to find a CD or other package recording media for recording the desired musical software and mount the CD on the recording/reproduction apparatus. That is to say, the user needs only to operate the recording/reproduction apparatus to select, read out and reproduce the musical software from the HDD.

Thus, such a recording/reproduction apparatus is extremely convenient specially for, among others, a user who owns a large number of CDs or the like. In addition, since there is no need to replace the CDs or the like, for example, it is possible to simply and conveniently do things such as enjoyment of a music content by selecting a piece of music data suitable for the state of mind and the situation, which prevail at that time.

Also, such a recording/reproduction apparatus makes it possible to communicate through the network, by communicating with an external server (information distribution apparatus), downloading music contents can be implemented. That is to say, the recording/reproduction apparatus factions as an information communication terminal.

Since a downloaded content is also stored in the HDD, the user can enjoy music or the like with ease.

By the way, a content downloaded or distributed by an external server normally has a content ID assigned to the content. Thus, contents stored for example in the HDD of an information communication terminal or a recording/reproduction apparatus can be managed by using content IDs assigned to the contents.

On the other hand, a content copied by the user from recording media such as a CD to the HDD does not have a content ID from the beginning. Thus, in order to manage such contents recorded on the HDD, the information communication terminal assigns a content ID to each of the contents.

In an HDD under the condition described above, no uniformity exists between content IDs assigned to contents copied (ripped) from a recording medium such as a CD contents downloaded from an external server.

The non-existence of uniformity inadvertently limits the enhancement of the operating function of the equipment and the improvement of services provided for the user.

For example, there is no way to contents distributable from an external server in a process to present distributable contents are contents already stored in the HDD. To put it concretely, the user is not capable of determining whether or not a content cataloged on a content list showing distributable contents worth charging for is a content already stored in the HDD. An example of the content is musical software.

In addition, even if the user wants to acquire various kinds of information on a particular content such as musical software, which has been ripped from a recording medium such as a CD, from an external server, since the content ID assigned to the particular content is different from the content ID cataloged in the server as an ID assigned to the same content available in the server, a communication process cannot be carried out smoothly.

DISCLOSURE OF INVENTION

It is thus an object of the present invention addressing the problems described above to improve functions of an information communication terminal and services rendered by the terminal by managing contents on the basis of management of content IDs, which are assigned to the contents and managed as IDs conforming to a rule of uniformity.

An information communication terminal provided by the present invention includes: communication means capable of communicating with an external apparatus through a network; storage means for storing contents and content management information; content storage control means for reading out a content from a recording medium and writing the content into the storage means; content-identifying information transmission control means for generating content-identifying information related to a content stored by the content storage control means in the storage means and driving the communication means to transmit the content-identifying information to an external information distribution apparatus for managing content identifiers; and management-information control means for executing control to manage contents stored in the storage means by using content identifiers, which are received by the communication means from the information distribution apparatus in response to the transmitted content-identifying information and included in the content management information.

In this case, the content-identifying information transmission control means generates the content-identifying information as information on a recording medium itself from which the content storage control means reads out a content.

The content-identifying information is information generated from management information for the recording medium.

As an option, the content-identifying information is information generated from barcode information provided on the recording medium.

As another option, the content-identifying information is information generated from ISRC information provided on the recording medium.

The content identifier is a content identifier issued by an external information distribution apparatus for managing the content identifier.

In addition, the content identifier is a content identifier conforming to a CIDF.

The content-identifying information transmission control means generates the content-identifying information as information on a recording medium itself, from which the content storage control means reads out a content, and drives the communication means to transmit the content-identifying information to an external information distribution apparatus for managing content identifiers whereas the management-information control means includes content identifiers, which are received by the communication means from the information distribution apparatus in response to the transmitted content-identifying information, in the management information as content identifiers associated with all contents recorded in the recording medium.

In this case, the management-information control means manages information indicating whether or not a content identified by each content identifier included in the management information has been stored in the storage means.

The content-identifying information transmission control means drives the communication means to transmit the content-identifying information to an external information distribution apparatus for managing additional information on contents, and the management-information control means executes control to manage the additional information received by the communication means from the information distribution apparatus in response to the transmitted content-identifying information as information associated with a content identifier in the management information.

In addition, the content-identifying information transmission control means generates the content-identifying information as information on a recording medium itself, from which the content storage control means reads out a content, and drives the communication means to transmit the content-identifying information to an external information distribution apparatus for managing additional information associated with contents, whereas the management-information control means executes control to manage, where the additional information is received by the communication means from the information distribution apparatus in response to the transmitted content-identifying information, the additional information with all contents recorded in the recording medium as information associated with each content identifier in the management information.

Moreover, there are further provided: determination means for determining whether or not a content identified by each content identifier on a content list received by the communication means from an external information distribution apparatus as a list of content identifiers has been stored in the storage means by referring to the management information on the basis of the content identifiers on the content list; and display means for displaying the content list in a display state showing determination results produced by the determination means.

As an alternative, there are further provided: content-identifier transmission control means for controlling the communication means to transmit content identifiers of all or at least some of contents stored in the storage means to an external information distribution apparatus for managing a content list of content identifiers; and display means for displaying a content list in a display state showing determination results received along with the content list from the information distribution apparatus as determination information indicating whether or not a content identified by each content identifier on the content list has been stored in the storage means.

In addition, there are further provided: reproduction means for reproducing and outputting a content stored in the storage means or a content recorded on another recording medium; content-identifier transmission control means for searching the management information for the content identifier of the content reproduced by the reproduction means and controlling the communication means to transmit the content identifier to an external information distribution apparatus; and display means for displaying information received by the communication means from the information distribution apparatus as information transmitted by the information distribution apparatus in response to the transmitted content identifier.

In addition, there is provided content-identifier transmission control means for controlling the communication means to transmit content identifiers of all or at least some of contents stored in the storage means to an external information distribution apparatus for executing backup management.

An information communication terminal provided by the present invention includes: communication means capable of communicating with an external apparatus through a network; broadcast reception means; extraction means for extracting a content identifier from a signal received by the broadcast reception means; content-identifier transmission control means for controlling the communication means to transmit the content identifier extracted by the extraction means to an external information distribution apparatus; and display means for displaying information received by the communication means as information transmitted by the information distribution apparatus in response to the transmitted content identifier.

An information communication terminal provided by the present invention includes: communication means capable of communicating with an external apparatus through a network; broadcast reception means; content-identifying information transmission control means for generating content-identifying information from information such as information on a broadcasting station and/or a broadcasting time, which are received by the broadcast reception means, and driving the communication means to transmit the content-identifying information to an external information distribution apparatus for managing content identifiers; content-identifier transmission control means for controlling the communication means to transmit a content identifier received by the communication means from the external information distribution apparatus in response to the transmitted content-identifying information to another external information distribution apparatus; and display means for displaying information received by the communication means from the other information distribution apparatus as information transmitted by the other information distribution apparatus in response to the transmitted content identifier.

An information distribution apparatus provided by the present invention includes: communication means capable of communicating with an information communication terminal through a network; storage means for storing content identifiers in a state allowing one of the content identifiers or a plurality of aforementioned content identifiers to be identified on the basis of content-identifying information; search means for carrying an operation to search the storage means for one of the aforementioned identifiers or a plurality of aforementioned content identifiers associated with content-identifying information received by the communication means from an information communication terminal in the event of the reception of the content-identifying information and extracting the content identifiers found in the search operation from the storage means; and distribution control means for controlling the communication means to transmit the content identifiers found by the search means as a result of the search operation to the information communication terminal transmitting the content-identifying information.

In this case, the content-identifying information is information for a recording medium itself from which the information communication terminal is capable of reading out a content.

The content-identifying information is information generated from management information for a recording medium from which the information communication terminal is capable of reading out a content.

As an option, the content-identifying information is information generated from barcode information provided on a recording medium from which the information communication terminal is capable of reading out a content.

As another option, the content-identifying information is information generated from ISRC information provided on a recording medium from which the information communication terminal is capable of reading out a content.

The content identifier is a content identifier issued by the information distribution apparatus for managing content identifiers in conjunction with the information communication terminal as identifiers conforming to a rule of uniformity.

In addition, the content identifier is a content identifier conforming to a CIDF.

The storage means is also used for storing additional information associated with content-identifying information. When the communication means receives content-identifying information from an information communication terminal, the search means uses the received content-identifying information to carry out an operation of searching the storage means for additional information associated with this content-identifying information and extracts the additional information found in the search operation from the storage means. The distribution control means then controls the communication means to transmit the additional information extracted by the search means as a result of the search operation to the information communication terminal from which the content-identifying information has been received.

An information distribution apparatus provided by the present invention includes: communication means capable of communicating with an information communication terminal through a network; storage means for storing a content list including content identifiers managed in conjunction with the information communication terminal as identifiers conforming to a rule of uniformity; and distribution control means for controlling the communication means to transmit the content list stored in the storage means as a list including the content identifiers managed as identifiers conforming to a rule of uniformity to the information communication terminal.

An information distribution apparatus provided by the present invention includes: communication means capable of communicating with an information communication terminal through a network; storage means for storing content lists each including content identifiers managed in conjunction with the information communication terminal as identifiers conforming to a rule of uniformity; determination means for determining whether or not a content identified by each content identifier on one of the content lists to be distributed has been stored in the information communication terminal in the event of reception of content identifiers of all or some contents stored in the information communication terminal by the communication means from the information communication terminal; and distribution control means for controlling the communication means to transmit a content list to be distributed and determination results produced by the determination means to the information communication terminal.

An information distribution apparatus provided by the present invention includes: communication means capable of communicating with an information communication terminal through a network; storage means for storing information relevant to contents as information associated with content identifiers managed in conjunction with at least the information communication terminal as identifiers conforming to a rule of uniformity; search means for carrying an operation to search the storage means for information associated with a specific one of the content identifiers received by the communication means from an information communication terminal in the event of the reception of the specific content identifier and extracting the information found in the search operation from the storage means; and distribution control means for controlling the communication means to transmit the information found by the search means as a result of the search operation to the information communication terminal transmitting the specific content identifier.

An information distribution apparatus provided by the present invention includes: communication means capable of communicating with an information communication terminal through a network; and backup storage means for storing received content identifiers of all or some of contents stored in the information communication terminal as content identifiers, which are managed in conjunction with the information communication terminal as identifiers conforming to a rule of conformity, in the event of the reception of the content identifiers by the communication means.

In addition, the present invention also provides an information distribution system including the information communication terminal with a variety of configurations described above and information distribution apparatus with a variety of configurations wherein the information communication terminal are capable of communicating with the information distribution apparatus through a network.

On the top of that, the present invention also provides a content management method or a broadcast reception method of carrying out operations of the information communication terminal with a variety of configurations described above.

Furthermore, the present invention also provides an information distribution method of carrying out operations of the information distribution apparatus with a variety of configurations described above.

Moreover, the present invention also provides programs for carrying out operations of the information communication terminal and the information distribution apparatus and a recording medium for storing the programs.

In accordance with the present invention, in the information communication terminal and the information distribution apparatus, contents are managed by using content identifiers managed as identifiers conforming to a rule of uniformity. In particular, contents ripped from disc media such as a CD and stored in an information communication terminal are also managed by using content identifiers acquired from an information distribution apparatus so that the stored contents can be managed by using content identifiers managed in conjunction with the information distribution apparatus.

Thus, when the information communication terminal specifies a content in a communication with the information distribution apparatus, a content identifier, conforming to a rule of uniformity, assigned to the content can be used in specifying the content. As a result, it is possible download a content, to acquire additional information and to render a variety of services.

BRIEF DESCRIPTION OF DRAWINGS

FIG. 11A is an explanatory diagram showing a CD title information database and a content-ID database, which are provided by the embodiment;

FIG. 11B is an explanatory diagram showing a CD title information database and a content-ID database, which are provided by the embodiment;

FIG. 13 is an explanatory diagram showing further communication processing to acquire CD information including a content ID in accordance with the embodiment;

FIG. 14A is an explanatory diagram showing a song-list database and a content database, which are provided by the embodiment;

FIG. 14B is an explanatory diagram showing a song-list database and a content database, which are provided by the embodiment;

FIG. 18 is an explanatory diagram showing a typical display of the song list provided by the embodiment;

BEST MODES FOR CARRYING OUT THE INVENTION

An information distribution system provided by the present invention and an information distribution method for the system are explained in detail by referring to diagrams showing their embodiments.

Figure 1:
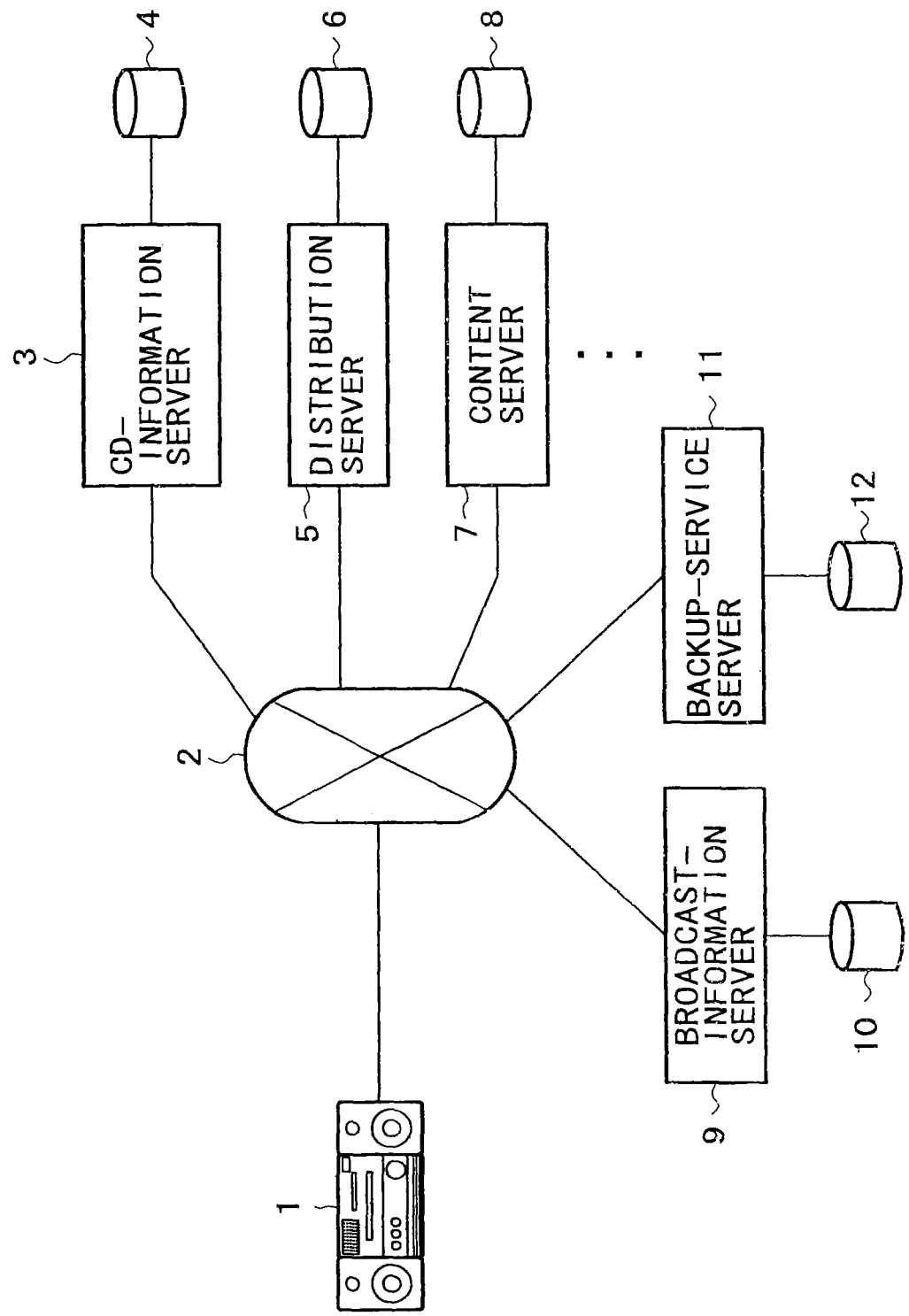
FIG. 1 is an explanatory diagram showing an information distribution system implemented by an embodiment of the present invention.

The embodiments of the present invention are described in chapters arranged in the following order:
1: Outline of the Information Distribution System
2: Configuration of the CD-Information Server
3: Configuration of the Terminal
4: CD-Information Database
5: Information Stored in the HDD of the Terminal 6: Processing Carried Out When Mounting a CD on the Terminal
7: System Including a CD Title Information Server and a Content-ID Server
8: The Distribution Server, the Content Server and a Song List
9: Processing to Display a Song List in the Terminal
10: Processing by the Distribution Server in Song-List Transmission
11: Information Acquisition Processing Based on a Transmitted Content ID at a Reproduction Time
12: First Processing to Acquire Information by Transmission of a Content ID at a Broadcast Reception Time
13: Second Processing to Acquire Information by Transmission of a Content ID at a Broadcast Reception Time
14: Backup Services
1: Outline of the Information Distribution System FIG. 1 is an explanatory diagram showing an information distribution system implemented by an embodiment.

This information distribution system is a system connecting a terminal 1 used by a general user at a home to a variety of servers rendering information services, which are related to the use of the terminal 1, through a network 2 in a state allowing the terminal 1 and the servers to communicate with each other through the network 2. An example of the terminal 1 is a recording/reproduction apparatus.

The network 2 can be a public line network or a network constructed as a network dedicated for the information distribution system. In addition, the network 2 can be a CATV network, a wireless-communication network, a network based on satellite communication lines or another kind of network. That is to say, the configuration of the communication and the configuration of the transmission line are not particularly limited to specific ones.

The terminal 1 used by the general user will be described in detail later. The terminal 1 includes a large-capacity internal data-file storage unit such as an HDD 31 shown in FIG. 3. The terminal 1 also has a function to drive package media and a function to input and output data from and to the network 2. Examples of the package media are an optical disc, a magneto-optical disc and a semiconductor memory card. Typically, the function to drive package media is a function to reproduce data from a CD.

The terminal 1 is capable of storing a content into a storage unit such as the HDD as a file. The content can be an audio content reproduced from a CD or a content downloaded to the terminal 1 by way of the network 2.

In this embodiment, a music content is taken as an example. It is to be noted, however, that the present invention is capable of keeping up with a variety of contents such as a video content, text data, an application program and game software.

In addition, the terminal 1 allows the user to reproduce an arbitrary file selected among those stored in the storage unit such as the HDD. Typically, a music content such as a piece of music is stored in the storage unit as a file. Thus, if a user owning a large number of CDs stores all pieces of music on all the CDs into the terminal 1 in advance, the user will be capable of reproducing a desired piece of music without going to all the trouble of selecting one of the CDs and mounting the selected CD on the terminal 1.

The terminal 1 can conceivably be designed into a so-called radio-cassette configuration suitable for use as audio equipment at the home of the user. Of course, the terminal 1 can also be designed as an apparatus of a component type.

Typically, on the front panel of the terminal 1, a variety of operation keys and operation buttons is provided as keys and buttons to be operated by the user. The keys include a rotation/push-type key known as a jog dial.

In addition, as output members each used for outputting a result of reproduction to the user, a speaker and a display unit are provided. The speaker as an output member for outputting typically a reproduced sound and the display device is an output member for displaying/outputting various kinds of information.

On the top of that, the terminal 1 also has an optical-disc insertion unit into which the user inserts an optical disc owned by the user in an operation to reproduce a content from the disc or to copy a content data from the disc to typically the internal HDD to be described later. Examples of the optical disc are an audio CD, a CD-ROM, a CD-R and a CD-RW.

In the information distribution system shown in FIG. 1, servers capable of communicating with the terminal 1 described above include a CD-information server 3, a distribution server 5, a content server 7, a broadcast-information server 9 and a backup-service server 11.

An operating function of each of the servers will be described later. The following description explains only an outline of each of the servers.

Provided with a CD-information database 4, the CD-information server 3 is a server for managing content IDs as IDs conforming to a rule of uniformity at least in the information distribution system. As described earlier, a content ID is an identifier assigned to each of generally distributed contents. For example, a unique content ID is assigned to the title of each song recorded on a CD sold in the general market. Thus, the CD-information server 3 manages for example content IDs assigned to pieces of music recorded on CDs.

In addition, the CD-information server 3 also makes use of the CD-information database 4 for managing CD title information as additional information for CD albums or music contents themselves.

The additional information serving as the CD title information includes typically texts, pictures, the URL (Uniform Resource Locator) of the home page of each artist, information on copyrights and the names of relevant people. The texts include the title of a song, the name of an artist and the lyrics of a song. The pictures include the background image of a song, the photo of an artist and a picture displayed on the jacket of a disc. The URL is an address on the Internet. The relevant people include a lyrics composer, a song writer and a producer.

The CD-information server 3 has a function to distribute a content ID and additional information to terminals 1.

By receiving content IDs each managed as an ID conforming to a rule of uniformity from the CD-information server 3 and using such content IDs, the terminal 1 is thus capable of managing contents ripped from a CD or the like and stored into typically the HDD. In addition, the terminal 1 is capable of receiving various kinds of additional information for contents stored in the HDD or the like from the CD-information server 3 and storing the additional information typically in the HDD to be displayed later in a variety of operations.

The distribution server 5 is a server for rendering services to distribute contents. The distribution server 5 has a song-list database 6 for managing a song list of music contents to be typically distributed to users as contents worth charging for.

The distribution server 5 distributes a song list to the terminal 1 as a part of a service rendered to download a music content to the terminal 1.

Music contents on the song list are managed by using content IDs assigned to the contents.

The content server 7 is a server for managing music contents themselves, that is, contents to be actually distributed to general users. Music contents for distribution are stored in a content database 8. When the user of the terminal 1 carries out an operation desiring a purchase (transmission) of a music content on a song list, the content server 7 downloads the desired music content to the terminal 1.

As described above, music contents are managed by using content IDs assigned to the contents.

The broadcast-information server 9 is a server for managing a variety of broadcasting stations such as radio and television broadcasting stations and their broadcasting time tables. The broadcast-information server 9 is also a server for recognizing a content ID assigned to a content to be broadcasted. In a broadcast-information database 10, the time tables of the broadcasting stations and content IDs assigned to contents to be broadcasted are stored.

By transmitting information on a broadcasting station and a broadcasting time to the broadcast-information server 9 when receiving a broadcast from the station, the terminal 1 is capable of acquiring the content ID of a content included in the broadcast.

Provided with a backup database 12 for storing management information of the terminal 1, the backup-service server 11 is a server for rendering backup services for the terminal 1. That is to say, by storing management information including the content ID of a content stored in the terminal 1 as a backup, the backup-service server 11 is capable of rendering a necessary service in the event of an accident in the terminal 1 or the like.

It is to be noted that the typical information distribution system shown in FIG. 1 is no more than an example. For example, the content server 7 can be operated by each of numerous recording companies. In this case, the information distribution system actually includes a number of content servers 7. By the same token, an information distribution system may include a number of any servers other than the content server 7.

In accordance with the above description, the CD-information server 3 is a server for rendering a service of managing content IDs and management information for generally distributed CDs. Of course, the CD-information server 3 may conceivably be a server for numerous kinds of package media such as a DVD and an MD. In addition, the CD-information server 3 may conceivably be a server for managing also content IDs of other contents including not only music contents, but also video contents as IDs conforming to a rule of uniformity.

2: Configuration of the CD Information Server

Figure 2:
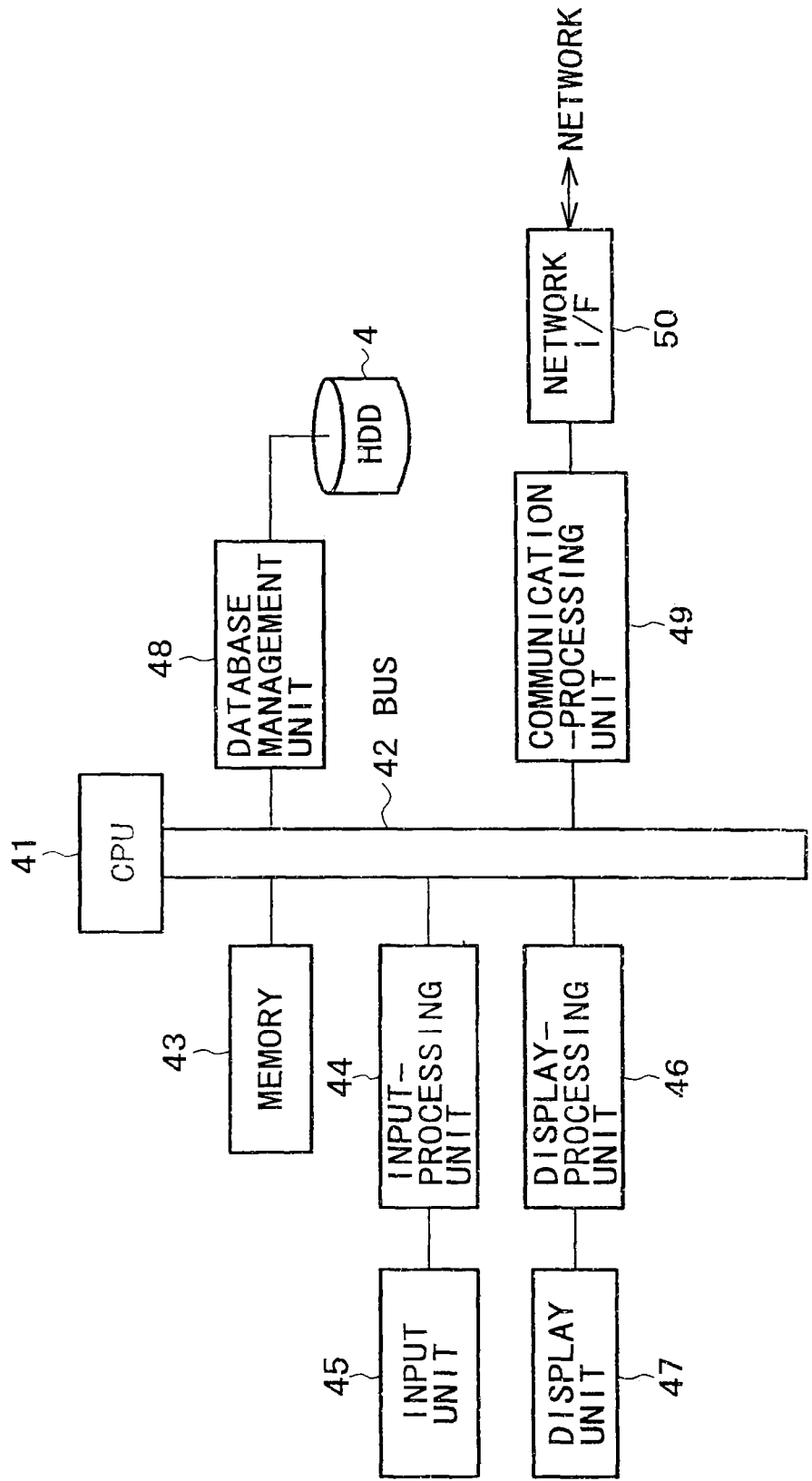
FIG. 2 is a block diagram showing a CD-information server provided by the embodiment.

FIG. 2 is a diagram showing the configuration of the CD-information server 3.

A CPU 41 controls the whole CD-information server 3 and carries out processing on the basis of an activated program. For example, the CPU 41 executes operations of communication through the network 2, operations on inputs and outputs from and to the operator, control of the CD-information database 4 and data processing.

The CPU 41 exchanges control signals and data with other circuit components through a bus 42.

A memory unit 43 comprehensively represents memories such as a RAM, a ROM and a flash memory, which are used in processing carried out in the CPU 41.

The ROM of the memory unit 43 is used for storing, among others, operating programs of the CPU 41 and a program loader. The flash memory of the memory unit 43 is used for storing, among others, a variety of processing coefficients and parameters used in the programs. Areas are allocated temporarily in the RAM of the memory unit 43 to data used in a program being executed and a task.

An input unit 45 includes a keyboard, a mouse, a touch panel, a remote commander and other input devices. The input unit 45 receives a variety of operation and data inputs entered by the operator of the CD-information server 3. The input information is subjected to a predetermined process in an input-processing unit 44 before being passed on to the CPU 41. The CPU 41 executes necessary processing and control for the input information.

A display unit 47 includes display devices such as a CRT and a liquid-crystal panel for showing various kinds of information to the operator.

When the CPU 41 supplies information to be displayed on the display unit 47 in dependence on a variety of operating conditions and a variety of input states to a display-processing unit 46, the display-processing unit 46 carries out operations to display the information on the display unit 47 on the basis of display data supplied to the display-processing unit 46.

In accordance with control executed by the CPU 41, a database management unit 48 carries out processing such as write/read access operations and search operations on the CD-information database 4, which is typically constructed in an HDD or the like.

As described above, the CD-information database 4 is used for storing CD title information (or additional information) and content IDs for the title of each generally distributed CD.

A communication-processing unit 49 carries out processing to encode data to be transmitted and decode received data on the basis of control executed by the CPU 41.

A network interface 50 transmits data encoded by the communication-processing unit 49 as data for transmission to a predetermined apparatus by way of the network 2. On the other hand, the network interface 50 also receives a signal transmitted by an external apparatus by way of the network 2 and passes on the signal to the communication-processing unit 49.

The communication-processing unit 49 transfers received information to the CPU 41.

It is to be noted that, while the configuration has been described by referring to FIG. 2 as the configuration of the CD-information server 3, the configuration shown in this figure can also be regarded as the configurations of the distribution server 5, the content server 7, the broadcast-information server 9, the backup-service server 11 as well as a CD title information server 3a and a content-ID server 3b, which will be described later by referring to FIG. 10. That is to say, in order for each particular one of the other servers to carry out operations to be described later, it is necessary to merely install programs for the particular server having the configuration shown in the figure and construct a database necessary for each of the other servers as shown in FIG. 1.

3: Configuration of the Terminal

Figure 3:
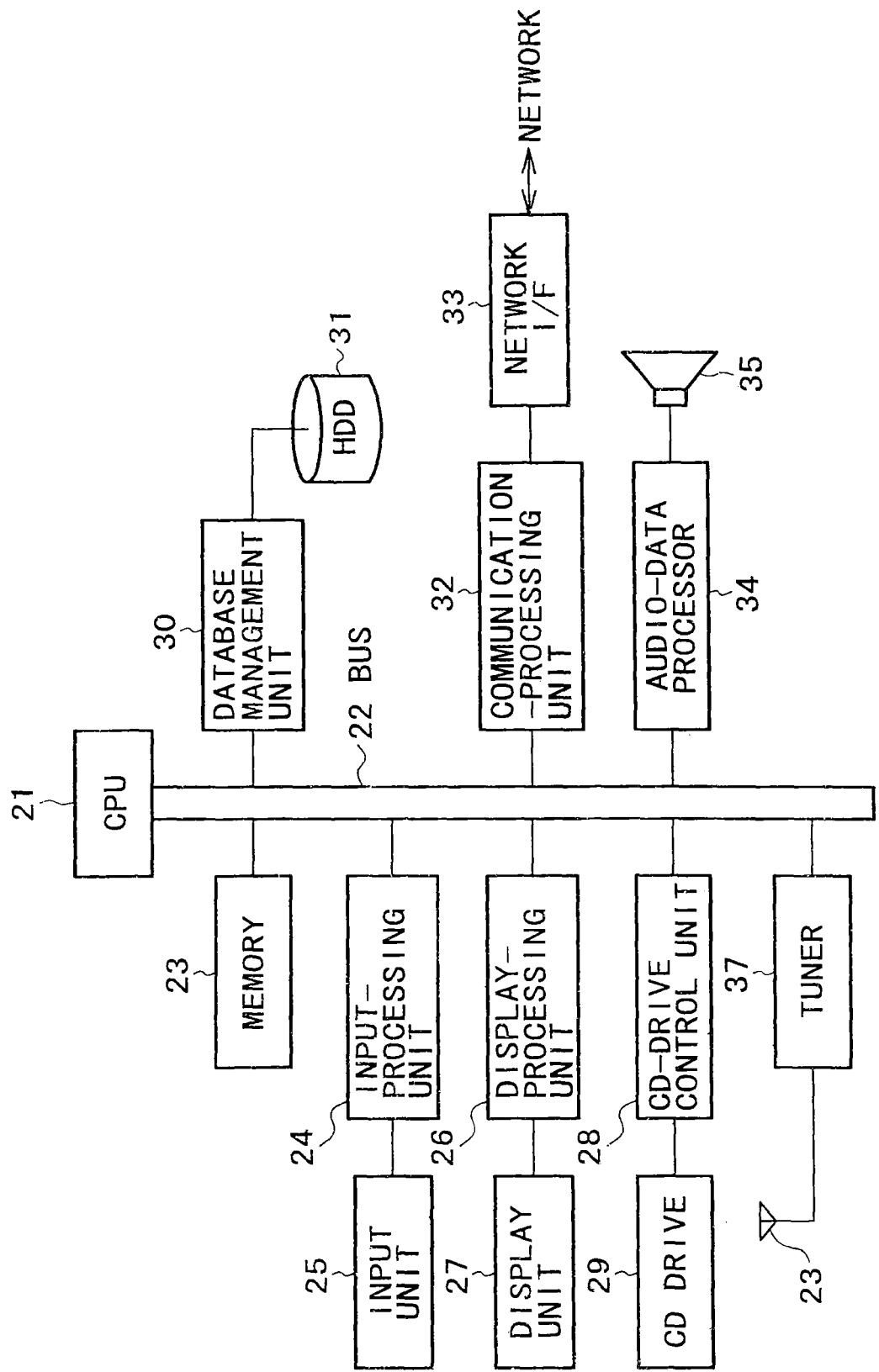
FIG. 3 is a block diagram showing a terminal provided by the embodiment.

FIG. 3 is a diagram showing the configuration of the terminal 1.

A CPU 21 controls the whole terminal 1 and carries out processing on the basis of an activated program. For example, the CPU 21 executes operations of communication through the network 2, operations on inputs and outputs from and to the operator, operations to reproduce or rip a content from a CD, operations to store a content into an HDD 31, operations to create and update management information, an operation to create a CD identifier to be used as content identification information for acquiring a content ID and data processing.

The CPU 21 exchanges control signals and data with other circuit components through a bus 22.

A memory unit 23 comprehensively represents memories such as a RAM, a ROM and a flash memory, which are used in processing carried out in the CPU 21.

The ROM of the memory unit 23 is used for storing, among others, operating programs of the CPU 21 and a program loader. The flash memory of the memory unit 23 is used for storing, among others, a variety of processing coefficients and parameters used in the programs. Areas are allocated temporarily in the RAM of the memory unit 23 to data used in a program being executed and a task.

Provided on the cabinet of the terminal 1, an input unit 25 includes operation keys, a jog dial, a touch panel, a remote commander, a barcode scanner and other input devices. The input unit 25 receives a variety of operation and data inputs entered by the user of the terminal 1. The input unit 25 may also includes a keyboard and a mouse.

The information received by the input unit 25 is subjected to a predetermined process in an input-processing unit 24 before being passed on to the CPU 21. The CPU 21 executes necessary processing and control for the input information.

It is to be noted that, if a touch panel is employed as an input device of the input unit 25, a display unit 27 displays a picture as the so-called GUI (Graphical User Interface) for facilitating operations. The touch panel has a configuration in which, when means such a finger or an input pen is applied to a position on the GUI picture, an operation corresponding to the position is carried out.

In addition, if a barcode scanner is employed as an input device of the input unit 25, the input unit 25 is capable of fetching for example a barcode appearing on the package (such as the album jacket) of a CD.

It is to be noted that, if the input unit 25 includes the ten keys, the user can also enter a barcode number added to the display of a barcode. In place of the ten keys, the GUI screen may include a ten-key picture allowing the user to enter a number by adoption of the touch-panel method. The barcode number is a number appearing beneath the barcode.

The display unit 27 includes display devices such as a liquid-crystal panel for showing various kinds of information to the user.

When the CPU 21 supplies information to be displayed on the display unit 27 in dependence on a variety of operating conditions and a variety of input states to a display-processing unit 26, the display-processing unit 26 carries out operations to display the information on the display unit 27 on the basis of display data supplied to the display-processing unit 26.

In an operation to reproduce a content from a CD or a content from the HDD 31, information such as a track number, a performance time duration, an operating state and a volume is displayed. In addition, if CD title information for the reproduced content has also been stored, various kinds of information such as the title of the song and the name of an artist singing the song can also be displayed.

In addition, in a process to receive a content transmitted by radio communication, information including the reception frequency and the volume is displayed.

Furthermore, a variety of operations to display information is carried out in accordance with communications with the various servers described above.

Provided with an optical head, a spindle motor, a reproduced-signal processor and a servo circuit, a CD drive 29 reproduces a content from a CD.

A CD-drive control unit 28 controls the CD drive 29 to carry out processing such as write/read access operations and search operations on the CD. When the user enters a command to carry out an operation to reproduce a content from the CD to the input unit 25, for example, the CPU 21 requests the CD-drive control unit 28 to reproduce the content from the CD. In turn, the CD-drive control unit 28 controls the CD drive 29 to make an access to the CD and reproduce the content from it.

The CD drive 29 decodes a signal read out from the CD to generate reproduced data and outputs the data to a bus 22 by way of the CD-drive control unit 28.

The reproduced data is subjected to various kinds of processing in an audio-data processor 34 before being output through a speaker 35. The processing includes a sound-field process such as equalizing and other processes such as volume adjustment, D/A conversion and amplification.

In addition, the data reproduced by the CD drive 29 can also be transferred to a database management unit 30 for carrying a necessary file-encoding process on the data before finally storing the data in the HDD 31 as a content file.

It is to be noted that, as is generally known, management information called a TOC is recorded in advance on the innermost circumference of a CD. In an operation to reproduce a content from the CD, an access to a track (or the content) on the disc is made on the basis of the TOC. Thus, when a CD is mounted on the terminal 1, the CD-drive control unit 28 gives a command to the CD drive 29 to read out the TOC from the CD to get data of the fetched TOC so that an operation to reproduce a content from the CD can be controlled.

A tuner 37 is typically an AM/FM radio tuner for demodulating a broadcast signal, which is received by an antenna 36, on the basis of control executed by the CPU 21. Of course, the tuner 37 can be a television tuner, a satellite-broadcast tuner or a digital-broadcast tuner.

A demodulated broadcast audio signal is subjected to necessary processing in the audio-data processor 34 before being output from the speaker 35 as a broadcast sound.

In accordance with control executed by the CPU 41, the database management unit 30 carries out write/read accesses to content files in the HDD 31 and a management file also stored in the HDD 31 as a file for managing the content files.

When a content reproduced by the CD drive 29 or a content downloaded from an external server is stored in the HDD 31 as a content file, a management file for the content file is also written into the HDD 31 or an existing management file is updated. As will be described later, the management file includes CD-title information and content IDs, which are acquired from the CD-information server 3.

In accordance with a command received from the CPU 21, the database management unit 30 is also capable of reading out a content file from the HDD 31 and transferring the file to the audio-data processor 34 for outputting the content as a sound from the speaker 35.

It is to be noted that the HDD 31 is used of course not only as a database of content files as described above, but also as a storage area for storing application programs to be activated by the CPU 21 and various kinds of data.

A communication-processing unit 32 carries out processing to encode data to be transmitted and decode received data on the basis of control executed by the CPU 21.

A network interface 33 transmits data encoded by the communication-processing unit 32 as data for transmission to a predetermined apparatus by way of the network 2. On the other hand, the network interface 33 also receives a signal transmitted by an external apparatus by way of the network 2 and passes on the signal to the communication-processing unit 32.

The communication-processing unit 32 transfers received information to the CPU 21.

It is to be noted that the configuration of the terminal 1 is not limited to that shown in FIG. 3. That is to say, there is a number of conceivable configurations, which can be adopted as a configuration of the terminal 1.

For example, other drives such as a DVD drive, an MD drive and a tape drive can be employed to handle a variety of recording mediums. In addition, the terminal 1 can be provided with interfaces with peripheral equipment conforming to communication methods including the USB and the IEEE1394.

On the top of that, the terminal 1 can also be provided with terminals for connection with a microphone and a headphone, a video output terminal for DVD reproduction, a line connection terminal and an opto-digital connection terminal.

Furthermore, a PCMCIA slot and a memory card slot can be created for cards for exchanging data with an external information-processing apparatus and an external audio apparatus.

4: CD-Information Database

Figure 4:
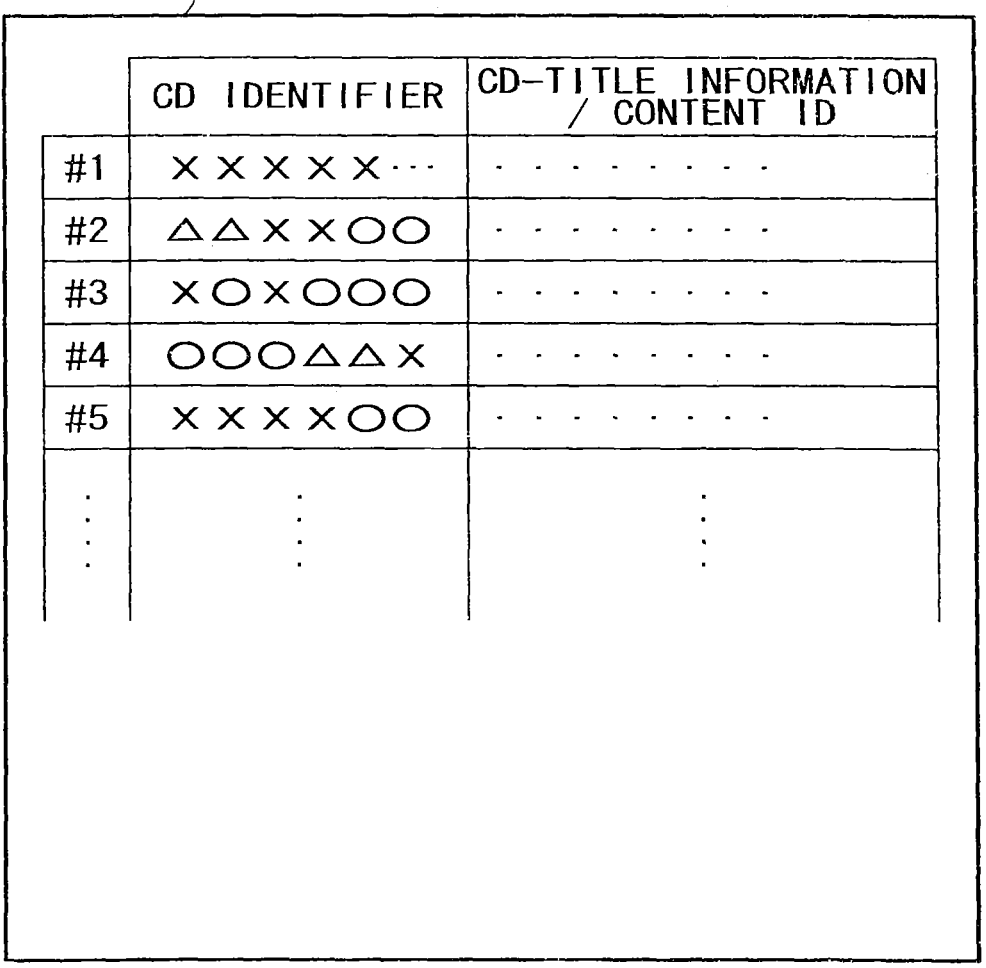
FIG. 4 is an explanatory diagram showing information stored in a CD-information database provided by the embodiment.

FIG. 4 is a diagram showing a model of CD information stored in the CD-information database 4 managed by the CD-information server 3.

The CD-information database 4 is used for storing information on a large number of CDs distributed in the market as package media. Pieces of information #1, #2 . . . shown in FIG. 4 are each CD information for one CD title.

A piece of CD information for a CD title includes a CD identifier unique to the CD title. As will be described later, in a communication with the terminal 1 through the network, the CD identifier is used as content identification information for identifying 1 content ID or a plurality of content IDs.

A configuration for generating CD identifiers is made common to all apparatus connected to the network. Since a CD identifier for a CD title is a code unique to the CD title, typical configurations for generating CD identifiers can be conceived as follows.

Generation of a CD Identifier from TOC Data of the CD

The TOC data of a CD includes the number of tracks (or the number of music contents), the address (or absolute time information) of each of the tracks and a performance time duration of each of the tracks. These pieces of data are normally provided as data common to discs having the same title. There is never a case in which CDs having titles different from each other all have the same pieces of data. Thus, a code unique to a CD title can be generated from the TOC data of the CD title.

For example, a unique code can be generated by extracting information such as the number of the first track, the number of the last track, the address of each track and the performance time duration from the TOC data and synthesizing these extracted values. As an alternative, a unique code is generated by carrying out special processing on each of the extracted values. The generated unique code is used as a CD identifier.

Generation of a CD Identifier from ISRC Information

For each CD title, an ISRC code is assigned to the album of the CD title or to each song of the CD title and recorded in the TOC. An ISRC code assigned to a CD title is a code unique to the CD title. Thus, as a CD identifier of a CD title, it is possible to use an ISRC code assigned to the CD title or a result of processing carried out on the ISRC code.

Generation of a CD Identifier from a Barcode

A barcode used as product management information is printed on the album jacket of each CD title. This barcode is assigned by a disc manufacturer to a CD title as information unique to the CD title and used in product management and sales management. Thus, as a CD identifier of a CD title, it is possible to use a barcode assigned to the CD title or a result of processing carried out on the barcode.

Of course, it is possible to adopt a CD-identifier generation configuration other than the typical configurations described above. For example, a CD identifier can be generated by jointly adopting the typical configurations described above. By adopting any of such configurations for generating a CD identifier, for example, the terminal 1 is thus capable of generating a CD identifier for each CD by adoption of the same CD-identifier generation configuration. In this embodiment, the terminal 1 needs to generate a CD identifier to be used as content identification information. Thus, a CD identifier generated by adoption of the CD-identifier generation configuration for each CD title is stored in advance in the CD-information database 4 as a CD identifier associated with the CD title. Thus, when the terminal 1 generates a CD identifier and transmits it to the CD-information server 3, the CD-information server 3 is capable of searching the CD-information database 4 on the basis of the CD identifier.

It is to be noted that the CD-information database 4 can conceivably be used for storing all CD identifiers generated by using a plurality of CD-identifier generation configurations for each CD title. By storing all CD identifiers in this way, the CD-information server 3 is capable keeping up with any a CD identifier generated by the terminal 1 by adoption of any of the CD-identifier generation configurations.

For each CD identifier, that is, for each CD title, the CD-information database 4 is also used for storing CD-title information and content IDs.

The CD-title information for a CD title is various kinds of additional information on data stored on the CD. Typically, the CD-title information includes a CD-title name, the names of artists, the number of recorded songs and the title of each content or each song.

A content ID is content identification information assigned to each content or each song recorded on the CD as an identification unique to the content.

Figure 5:
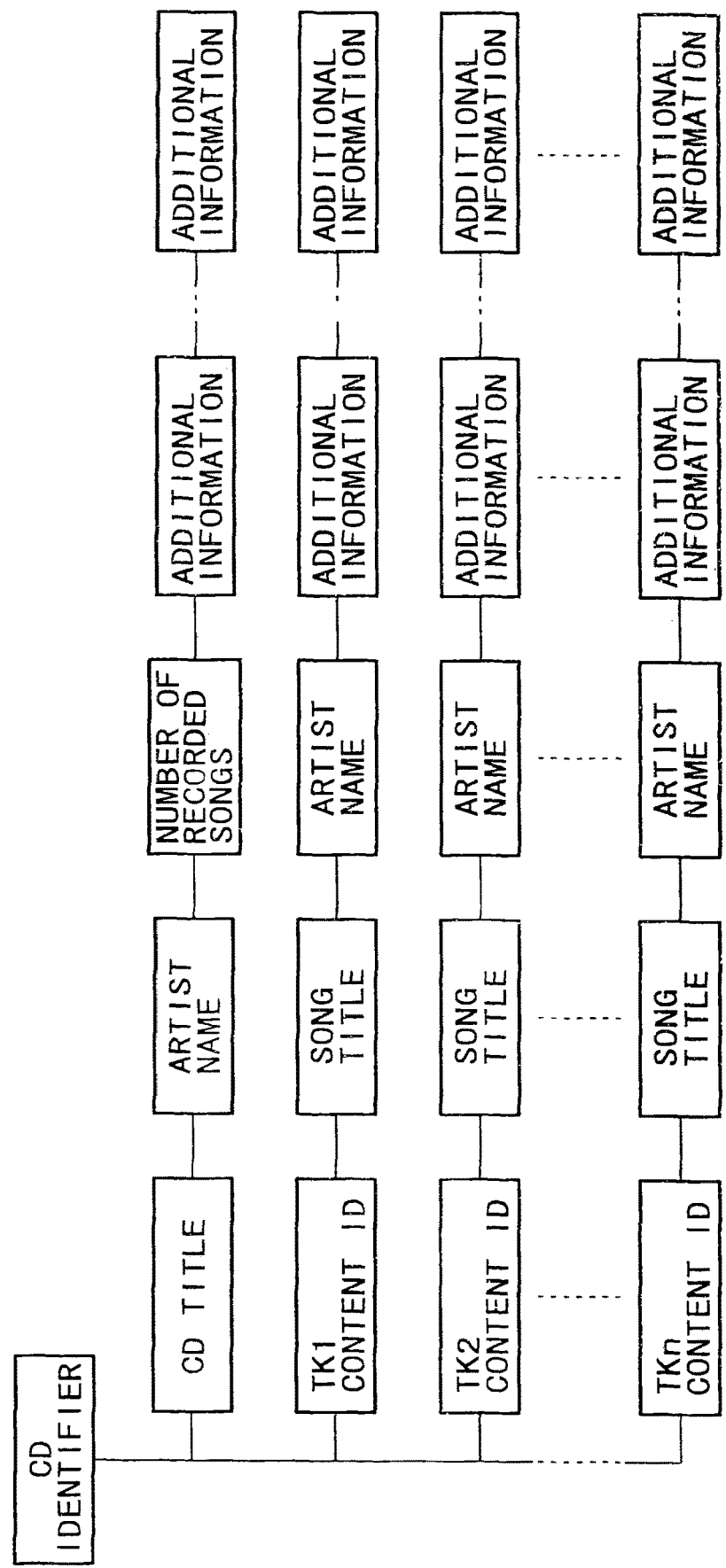
FIG. 5 is an explanatory diagram showing structure stored in the CD-information database provided by the embodiment.

FIG. 5 is a diagram showing the configuration of a file for storing a CD-title information and content IDs, which are associated with a CD identifier. The data file shown in FIG. 5 is thus used for storing information for one CD album.

First of all, the CD-title information for the CD identifier representing the whole CD is stored. The CD-title information includes the CD title (or the name of the album), the name of artists, the number of recorded songs and one piece of other additional information or various pieces of other additional information.

The other additional information cited above includes conceivable data such as a picture of the album jacket, pictures of artists, information on relevant parties such as the name of the producer and the name of the recording company, a text describing the album and comments on the album, the Internet addresses (URLs) of homepages of the artists, the recording company or the like as well as information on a copyright.

Besides the additional information described above, the content ID of each of songs (that is, tracks TK1 to TKn) is stored for the CD identifier.

For each content ID, additional information associated with a song identified by the content ID is stored. The additional information includes the title of the song, the names of the artists and one piece of other additional information or various pieces of other additional information. The other additional information provided for each song includes typically people relevant to the song, information on a copyright of the song, the lyrics of the song, comments on the song and images for the song. The relevant people include the writer of the lyrics, the composer of the song and the producer.

As described above, the CD-information database 4 is used for storing a CD-title information and content IDs, which are associated with a CD title, in the file structure shown in FIG. 5.

It is to be noted that, in the above description, the CD-title information for a CD identifier is information stored on the CD as information other than content IDs also stored on the CD for the same CD identifier. On the other hand, the CD information is the generic name of information including both the CD-title information and the content IDs.

By the way, a content ID assigned to each content representing a track or a song recorded on the CD is an identifier unique to the song.

In the information distribution system implemented by this embodiment, content IDs are managed as IDs conforming to a rule of uniformity. That is to say, each of the content IDs is common to the terminal 1, the CD-information server 3 and the other servers of FIG. 1 and used as information for identifying a specific song.

The CD-information server 3 generates a code data unique to each song and assigns the code to the song as the content ID of the song. The CD-information server 3 then provides the content ID to the other servers. Thus, the other servers are each also capable of managing music contents by using such content IDs. In addition, a content ID can be generated by an apparatus other than the CD-information server 3. At least, however, the CD-information server 3 is designated as an apparatus capable of managing content IDs. In this case, the management executed by the CD-information server 3 is management to provide content IDs to the terminal 1 or allow content IDs to be utilized by the other servers.

In addition, as uniform content IDs managed in a wide range, content IDs prescribed by a CIDF (Content ID Forum) can also be used.

With the popularization of the Internet and improvements of technologies for coding digital data, the CIDF has been established as an organization for enhancing the convenience of content distributions, facilitating the charging of content distribution fees to users, preventing copyrights from being infringed and avoiding illegal use of contents. The CIDF is an association for formulating a content-ID format considering global standardization targeted for the every digital contents. Thus, the use of content IDs conforming to the content-ID format developed by the CIDF is also effective for the information distribution system.

5: Information Stored in the HDD of the Terminal

Figure 6:
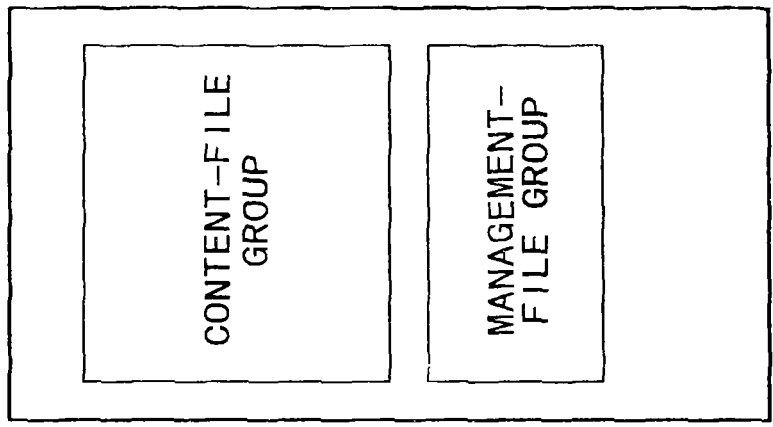
FIG. 6A is an explanatory diagram showing information stored in an HDD employed in the terminal provided by the embodiment.
FIG. 6B is an explanatory diagram showing information stored in the HDD employed in the terminal provided by the embodiment.

FIG. 6 is a diagram showing a model for the configuration of a file stored in the HDD 31 employed in the terminal 1.

As shown in the figure, in the terminal 1, a content (or a song) ripped from a CD can be stored into the HDD 31 as a content file. By the same token, a content downloaded from an external source by way of the network 2 can also be stored into the HDD 31 as a content file.

Assume for example that 5 songs are ripped from a CD for storing 10 songs. In this case, the 5 songs are stored in the HDD 31 as 5 content files.

Then, the user can select a desired content file from a large number of content files stored in the HDD 31 and reproduce the selected file.

A content-file group stored in the HDD 31 as shown in FIG. 6A is a group including a large number of content files, which are each 1 song recorded in the HDD 31. That is to say, the content-file group is a group including a large number of content files each containing actual data or music data.

On the other hand, a management-file group stored in the HDD 31 is a group including a large number of management files for managing the content files.

FIG. 6B is a diagram showing a model of the management-file group.

A management file is management information for a CD distributed in the market as package media. That is to say, management files #1, #2 . . . shown in FIG. 6B are each management information for 1 CD. As shown in the figure, each piece of management information includes a CD identifier as well as CD-title information and content IDs, which are associated with the CD identifier.

However, management files #1, #2 . . . in the HDD 31 are each generated for a content file stored by the user in the HDD 31.

For example, assume that the user rips songs from a CD and stores each of the songs recorded on the CD into the HDD 31 as a content file. In this case, a management file is generated for the CD and stored in the HDD 31.

In addition, assume for example that the user rips a song or a plurality of songs selected among songs recorded on a CD from the CD and stores each of the ripped songs into the HDD 31 as a content file. In this case, a management file is generated for the CD and stored in the HDD 31.

Furthermore, assume that a content is downloaded from an external source by way of the network 2 and stored into the HDD 31. If a CD identifier is also received from the network 2, a management file associated with recording media such as a CD for storing the downloaded content can be generated and stored in the HDD 31.

The CD identifier included in each management file is information indicating a CD from which the user ripped contents. As will be described later, for example, the CD identifier is used as content-ID determination information in acquiring a content ID through a communication with the CD-information server 3. That is to say, from the implication point of view, the CD identifier is the same as a CD identifier stored in the CD-information database 4 in the CD-information server 3.

Thus, the terminal 1 generates a CD identifier in the same generation configuration as the configuration to generate a CD identifier in the CD-information database 4. When content is ripped from a CD, for example, a CD identifier is generated from the TOC data of the CD. As an alternative, a CD identifier is generated from the ISRC information of the CD. As another alternative, a CD identifier is generated from a barcode printed on the CD. Of course, a CD identifier can be generated by adopting a generation configuration other than these generation configurations as long as the generation configuration is the same as the configuration to generate a CD identifier in the CD-information server 3.

As described above, each piece of management file includes a CD identifier as well as CD-title information and content IDs, which are associated with the CD identifier specifically each CD title.

Figure 7:
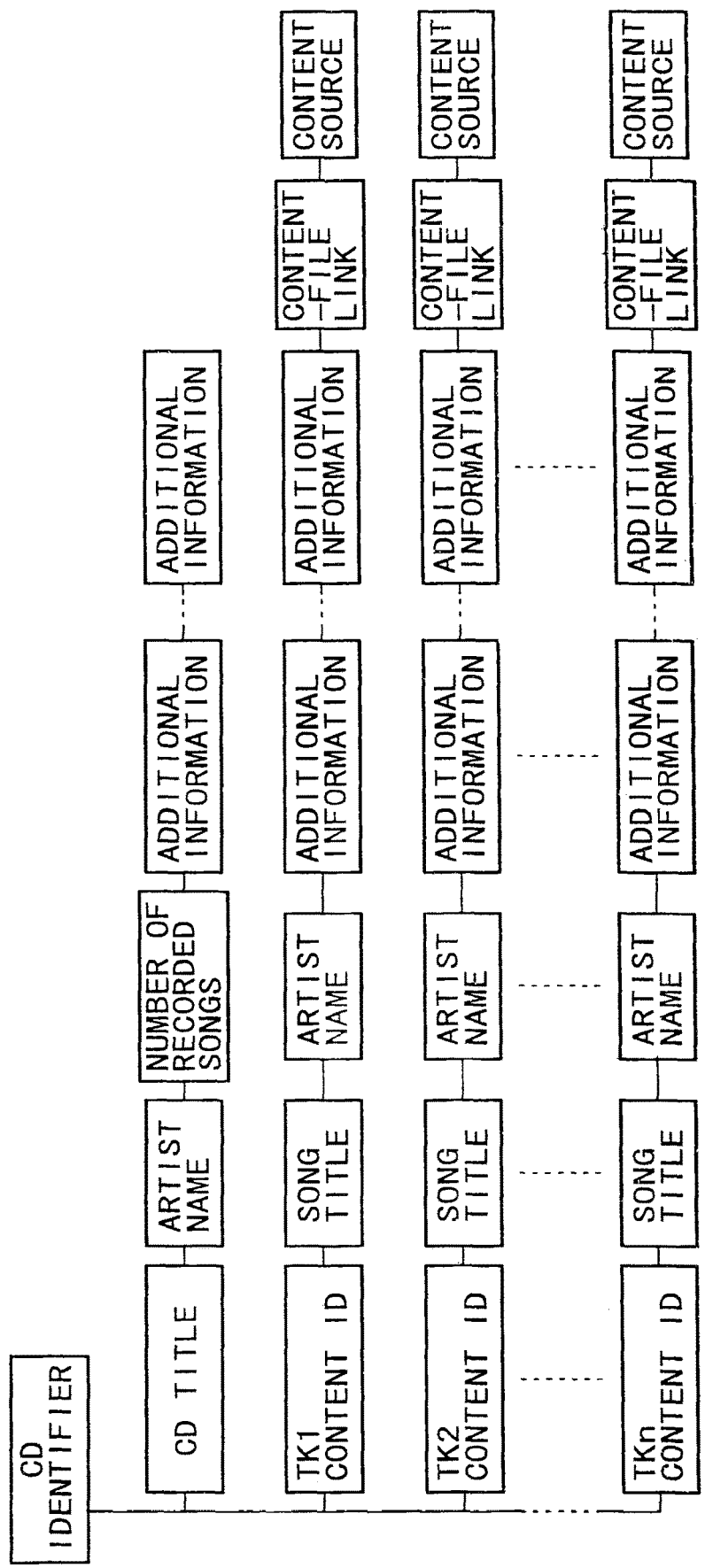
FIG. 7 is an explanatory diagram showing the data structure of information stored in the HDD employed in the terminal provided by the embodiment.

FIG. 7 is a diagram showing the data structure of a management file including a CD identifier as well as CD-title information and content IDs, which are associated with the CD identifier. The management file shown in FIG. 7 corresponds to 1 CD album. At least 1 content recorded in the CD album is stored in the HDD 31 as a content file. In some cases, however, none of the contents recorded in a CD album are stored in the HDD 31. For such a CD album, a management file can conceivably be created in advance for contents ripped or downloaded later.

First of all, additional information for the CD identifier representing the whole CD is stored. The additional information includes the CD title (or the title of the album), the name of artists, the number of recorded songs and one piece of other additional information or various pieces of other additional information.

The other additional information cited above includes conceivable data such as a picture of the album jacket, pictures of artists, information on relevant parties such as the name of the producer and the name of the recording company, a text describing the album and comments on the album, the Internet addresses (URLs) of homepages of the artists, the recording company or the like as well as information on a copyright.

Besides the additional information described above, the content ID of each of songs (that is, tracks TK1 to TKn) is stored for the CD identifier.

For each content ID, additional information associated with a song identified by the content ID is stored. The additional information includes the title of the song, the names of the artists and one piece of other additional information or various pieces of other additional information. The other additional information provided for each song includes typically people relevant to the song, information on a copyright of the song, the lyrics of the song, comments on the song and images for the song. The relevant people include the writer of the lyrics, the composer of the song and the producer.

In addition, for each content ID, content-file link information and information on the source of the content are stored.

The content-file link information for a content ID is information indicating a content file stored in the HDD 31 as a file containing actual data of a content indicated by the content ID. Thus, since the content-file link information indicates a constant file containing a content indicated by the content ID, the content stored in the HDD 31 can be specified from the management file and as a content to be reproduced.

It is to be noted that a content file containing actual data of a content indicated by the content ID may not be stored in the HDD 31. In this case, the content-file link information states 'No link' allowing the non-existence of the content file in the HDD 31 to be confirmed from the management file.

The information on the content source is information indicating the source of the content file stored in the HDD 31. Since a content file stored in the HDD 31 is a content ripped from a CD or a content file downloaded from an external server, the information on the content source distinguishes a ripped and downloaded contents from each other and, in the case of a downloaded content, identifies a server, from which the content has been downloaded.

As described above, a management file of the HDD 31 is associated with 1 CD title (or 1 CD identifier) and used for storing CD-title information and content IDs, which are associated with the CD title, in the data structure shown in FIG. 7.

In the case of the content file of a content ripped from a CD and stored in the terminal 1, the terminal 1 is capable of generating a CD identifier from the TOC information of the CD, from which the content has been reproduced.

As described above, however, a content ID is managed as an ID conforming to a rule of uniformity and generated by the CD-information server 3. A content ID may also be an ID conforming to the CIDF. Thus, a content ID is not an ID freely assignable to a content file of a content ripped from a CD. In addition, CD-title information cannot be obtained by the terminal 1 unless the user enters the information to the terminal 1.

For the reason described above, the terminal 1 transmits a generated CD identifier to the CD-information server 3 at a ripping time as will be described later. Then, for the transmitted CD identifier, the terminal 1 receives a content ID and CD-title information from the CD-information server 3 so that the terminal 1 is capable of creating a management file like the one shown in FIG. 7 to be used for managing the stored content file.

In addition, in the case of a downloaded content, if a content ID and additional information are also received in the downloading process, it is possible to construct a management file including the content ID and the additional information.

It is to be noted that, in the case of a content ripped from a CD or other recording media, a management file can be created as a unit corresponding to a CD identifier or a media identifier. In the case of a downloaded content from external servers, however, it is not always possible to build a management file for each recording medium.

Thus, if a management file cannot be built for each recording medium, the management file is built, being associated with at least a content ID so that the management file can be used for managing the stored content file.

6: Processing Carried Out when Mounting a CD on the Terminal

In this embodiment, a content file stored in the HDD 31 employed in the terminal 1 is managed by using a content ID included in a management file as shown in FIG. 7. In an operation to rip a content from a CD, however, its content ID and its CD-title information (or its additional information) cannot be obtained by only the terminal 1. Thus, the terminal 1 requests the CD-information server 3 to transmit the content ID and the CD-title information.

Figure 8:
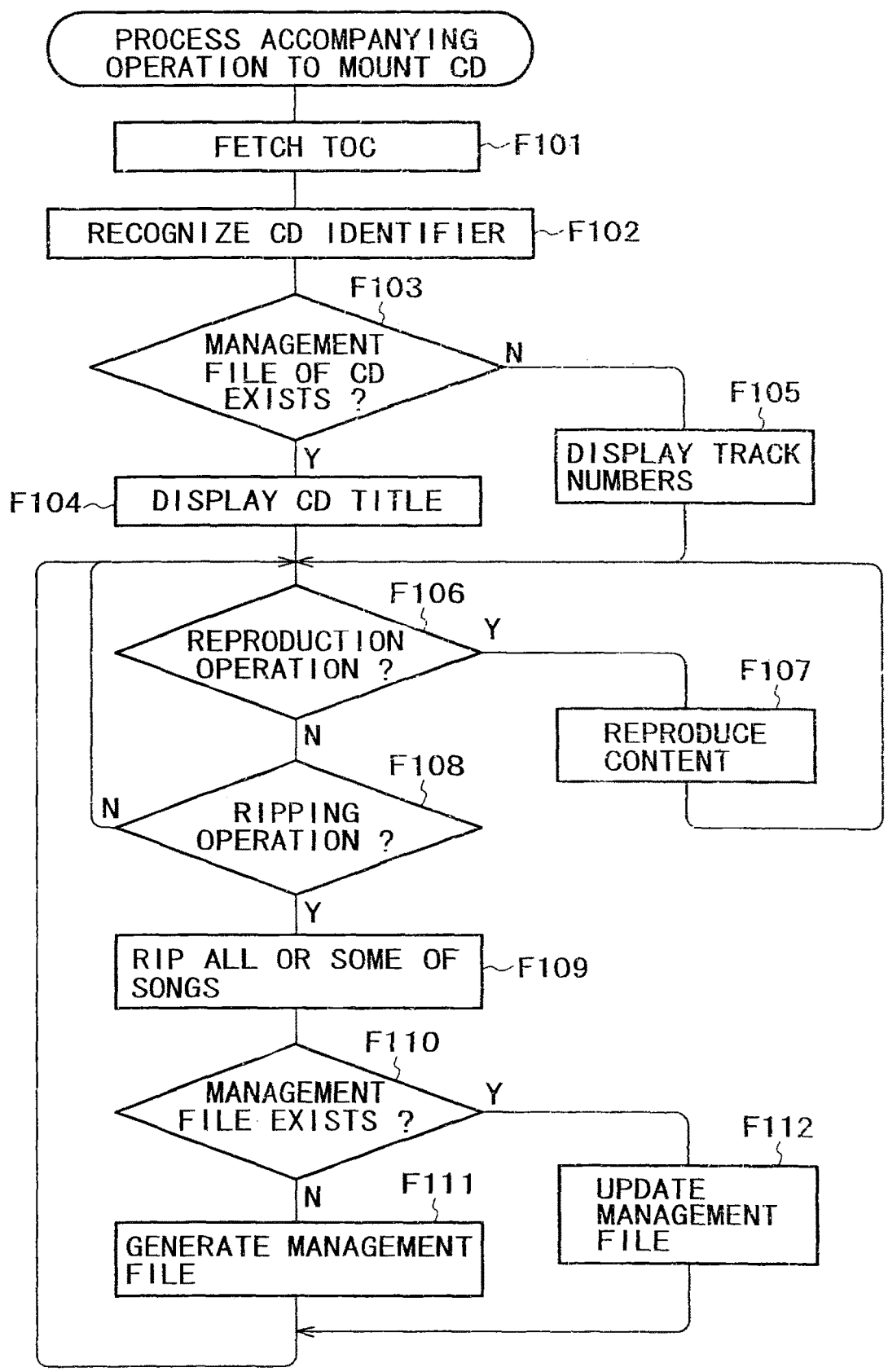
FIG. 8 shows a flowchart representing processing, which is carried out when a CD is mounted onto the terminal provided by the embodiment.
Figure 9:
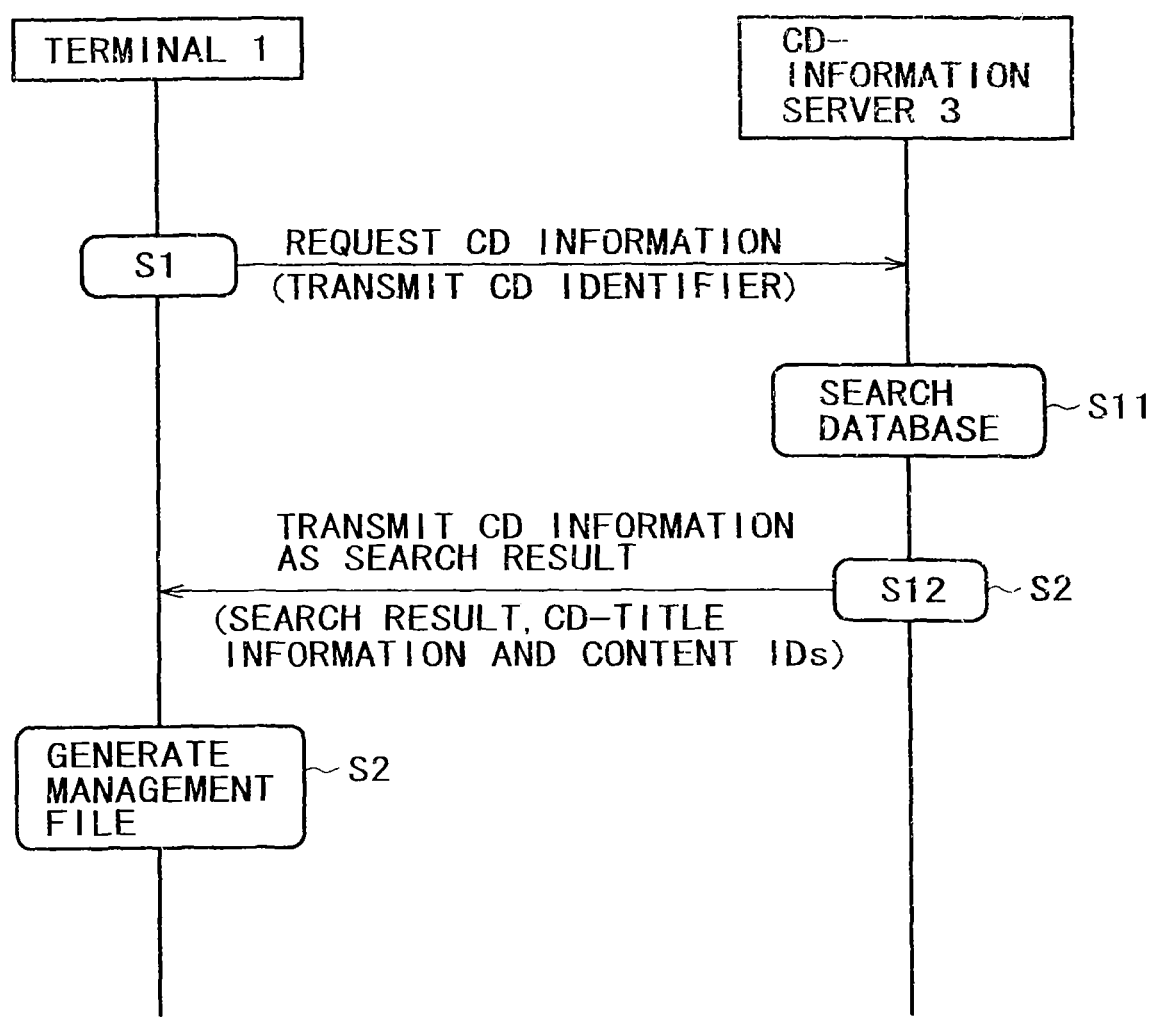
FIG. 9 is an explanatory diagram showing communication processing to acquire CD information including a content ID in accordance with the embodiment.

By referring to FIGS. 8 and 9, the following description explains processing, which is carried out after a CD is mounted on the CD drive 29 employed in the terminal 1 as processing including the operation of requesting the CD-information server 3 to transmit the content ID and the CD-title information. This processing is implemented as control executed by the CPU 21 and operations carried out by other components on the basis of the control.

It is to be noted that the following description explains typical processing in which a CD identifier for a CD is generated from TOC data of the CD.

As shown in FIG. 8, when a CD is mounted on the CD drive 29 employed in the terminal 1, at a step F101 of a flowchart shown in the figure, the CPU 21 gives a command to the CD-drive control unit 28 to read out TOC data of the CD first of all.

The TOC data read out from the CD is held in the CD-drive control unit 28 or the CPU 21 as management information for later reproduction of data from the CD. Then, at the next step F102, the CPU 21 determines a CD identifier of the CD. To put it in detail, the CPU 21 extracts information such as a track number and the address of the track from the TOC data, and carries out particular processing on the extracted information to generate a CD identifier unique to the CD.

It is to be noted that, as described before, a CD identifier may also be generated from an ISRC code included in the TOC data. As another alternative, at this point of time or a point of time a content is ripped from the CD, the user is requested to enter a barcode of the CD and a CD identifier is generated from the barcode. As described previously, the barcode can also be input by using a bar-code scanner or by allowing the user to enter a number representing the barcode.

Then, at the next step F103, the database management unit 30 searches the HDD 31 on the basis of the CD identifier for a management file including the CD identifier and a result of the search is examined to determine whether or not a management file for the mounted CD has already been stored in the HDD 31.

If the mounted CD is a CD experiencing a ripping process in the past, a management file for the mounted CD has already been stored in the HDD 31. Even if the mounted CD is not a CD experiencing a ripping process in the past, a content recorded on the CD may have been downloaded from an external server along with a CD identifier, additional information and the content ID. In this case, a management file for the mounted CD may have already been stored in the HDD 31.

If a management file for the mounted CD has already been stored in the HDD 31, the flow of the processing goes on to a step F104 at which the CD information is displayed on the display unit 27. For example, information stored in the HDD 31 as additional information shown in FIG. 7 can be displayed. As shown in the figure, the additional information typically includes the title of the album, the title of the song, the name of an artist and a jacket image. In this case, the CPU 21 reads out various kinds of additional information from the HDD 31 and supplies the information to the display-processing unit 26 to be displayed.

If a management file for the mounted CD has not been stored in the HDD 31, on the other hand, the flow of the processing goes on to a step F105 at which information based on the TOC data is displayed since the management file for the mounted CD is not available. To put it concretely, the CPU 21 supplies display information obtained from the TOC data to the display-processing unit 26, which then displays information such as track numbers and total performance time durations on the display unit 27.

At steps F106 and F108, the terminal 1 is waiting for the user to carry out an operation, which is an operation to reproduce or rip a content from the CD.

If the user carries out an operation to reproduce a content from the CD, the flow of the processing goes on from the step F106 to a step F107 at which the content is reproduced from the CD. That is to say, the CPU 21 gives a command to the CD-drive control unit 28 to control the CD drive 29 to execute a process of reproducing a track specified in accordance with the operation carried out by the user on the input unit 25.

When the user carries out an end operation or when reproduction of all songs from the CD has been completed, the flow of the processing goes back of the loop consisting of the steps F106, F107 and F108 to wait for the user to carry out a next operation.

If the user carries out an operation to rip all songs or some songs from the CD to the HDD 31, on the other hand, the flow of the processing goes on from the step F108 to a step F109 at which the CPU 21 carries out a process to rip the specified songs.

That is to say, the CPU 21 gives a command to the CD-drive control unit 28 to control the CD drive 29 to execute a process of reproducing a track or a plurality of tracks. Then, the audio data of the tracks reproduced by the CD drive 29 is transferred to the database management unit 30. Subsequently, the CPU 21 gives a command to the database management unit 30 to store the audio data of each of the tracks in the HDD 31 as a content file.

In the operation to store such content files, at a step F110, the CPU 21 determines whether or not a management file for the CD has been stored in the HDD 31. That is to say, the same processing as the step F103 is carried out. If a ripping operation has been carried out at least twice after the CD was mounted on the CD drive 29, a management file may be found at the step F110 in some cases even though a management file was not found at the step F103.

If a management file for the content files written into the HDD 31 has not been stored in the HDD 31, the flow of the processing goes on to a step F111 at which a process to generate a management file is carried out. If a management file for the content file written into the HDD 31 has been stored in the HDD 31, on the other hand, the flow of the processing goes on to a step F112 at which the management file is updated.

After the content files are written into the HDD 31 and a management file is generated or updated, the ripping operation is completed. Then, the flow of the processing goes back of the loop consisting of the steps F106, F107 and F108 to wait for the user to carry out a next operation.

It is to be noted that an operation to eject the mounted CD may be carried out during execution of the loop consisting of the steps F106 and F107 even though this operation is not shown in the figure. If the CD is ejected, the execution of the processing represented by the flowchart shown in FIG. 8 is ended.

The process carried out at the step F111 to generate a management file is explained by referring to FIG. 9.

The CPU 21 executes a procedure S1 of this process in order to issue a command to the communication-processing unit 32 to establish a communication with the CD-information server 3 through the network 2 by transmitting a request for establishment of the communication to the CD-information server 3. As the communication is established, the CD identifier obtained at the step F102 is transmitted to the CD-information server 3 as a signal making a request for information on the CD identified by the CD identifier.

The communication-processing unit 49 employed in the CD-information server 3 also carries out a process to establish a communication in response to a request received from the terminal 1 as a request for establishment of the communication. As the request signal including the CD identifier is received from the terminal 1, the CPU 41 employed in the CD-information server 3 issues a command to the database management unit 48 to search the CD-information database 4 on the basis of the CD identifier for information associated with the CD identifier.

Thus, the CD-information server 3 executes a procedure S11 to search the CD-information database 4 for CD information. As explained earlier by referring to FIGS. 4 and 5, for each CD identifier, the CD-information database 4 includes CD information including CD-title information and the content ID of every song recorded on the CD identified by the CD identifier. In this procedure, the CD-information database 4 is searched on the basis of the CD identifier for CD information associated with the received CD identifier. The CD information found in the search is extracted and read out from the CD-information database 4.

After the CD information like the one shown in FIG. 5 is extracted from the CD-information database 4 as CD information associated with the CD identifier, the CPU 41 executes the next procedure S12 to transmit the CD information to the terminal 1 as a result of the search. To put it in detail, the communication-processing unit 32 transmits information on a successful completion of the search or a search error as the result of the search to the terminal 1 and, in the case of a successful completion of the search, the communication-processing unit 32 also transmits the CD-title information and the content ID to the terminal 1.

After the CD-title information and the content ID are received as the result of the search, the terminal 1 executes a procedure S2 to generate a management file. Associated with the CD identifier, the management file includes CD-title information and the content ID of each song as shown in FIG. 7. In addition, content-file link information is set for each content ID stored in the HDD 31 as information showing a link to a content file of a content identified by the content ID. On the top of that, content-source information is added for each content ID as information indicating a CD from which a content identified by the content ID has been ripped.

The management file generated as a file having the structure shown in FIG. 7 as described above is then written into the HDD 31.

By carrying out the processing described above, content files also stored in the HDD 31 can be managed by using content IDs managed as IDs conforming to a rule of uniformity even if the content files have been ripped from a CD in the terminal 1.

As will be described later, since content files can be managed by using content IDs managed as IDs conforming to a rule of uniformity, the management of the content files is suitable for, among others, a case in which it is desired to acquire information related to a content from an external server.

Also as will be described later, a display suitable for the user can also be shown to the user. An example of the display is the display of a list of downloadable contents.

By the way, the CD information obtained by the terminal 1 through the communications shown in FIG. 9 is information on a CD identified by a CD identifier and includes the content ID of every song recorded on the CD and its additional information.

Thus, even if only some of songs recorded on a CD are ripped in the terminal 1, for example, content IDs of all songs and their additional information can be obtained. In other words, content IDs of songs not ripped and their additional information are also included in the management file.

Assume for example that only the second track is ripped from a CD containing 10 songs.

In this case, the CD-information server 3 transmits content IDs of all songs and their additional information to the terminal 1 through the communications shown in FIG. 9.

Thus, in the procedure S2, a process to correctly associate a ripped content file with one of the content IDs is carried out. To be more specific, since the second song (or the second track) is ripped, the CPU 21 associates the content file of the second song with a received content ID and received additional information, which are the content ID of the second track and its additional information respectively. In the typical CD information shown in FIG. 7, the ripped content file is associated with the TK2 content ID and, for this content ID, content-file link information indicating the content file is written.

In addition, content-file link information corresponding to a content file not ripped from the CD is set at 'no-link' data.

As described above, even if only some of songs recorded on a CD are ripped, content IDs of all songs and their additional information can be obtained so that the created management file is useful for later processing.

Consider for example a case in which, after the second track has been ripped as described above, another track is ripped from the same CD. In this case, the determination result produced at the step F110 of the flowchart shown in FIG. 8 indicates that a management file already exists. That is to say, the content IDs of all songs including the ripped song and their additional information have already been stored in the HDD 31.

Thus, in this case, it is not necessary to obtain information on the CD through the communications shown in FIG. 9. That is to say, in this case, the flow of the processing goes on to the step F112 at which the management information needs to be merely updated. To put it concretely, information indicating the other ripped content file written into the HDD 31 is added to the management information as content-file link information associated with a content ID of the other ripped track. In addition, information indicating that the content identified by the content ID is a content ripped from a CD is added to the management information as content-source information associated with the content ID.

Furthermore, even in the case of a CD from which at least 1 song has been ripped, additional information for all songs is provided to the terminal 1. Thus, when the CD is mounted on the terminal 1, at the step F104, the titles of all the songs and the CD-title information of the CD can be displayed to the user.

7: System Including a CD Title Information Server and a Content ID Server

By the way, in the information distribution system shown in FIG. 1, the CD-information server 3 must manage CD-title information and content IDs.

On the other hand, many CD title information servers exist as servers each used for rendering services to distribute CD-title information. If this CD title information server is to be used as the CD-information server 3 shown in FIG. 1, it will be necessary to add content IDs to the database of the CD title information server. Thus, the construction of the information distribution system will incur a high cost and require much labor.

Figure 10:
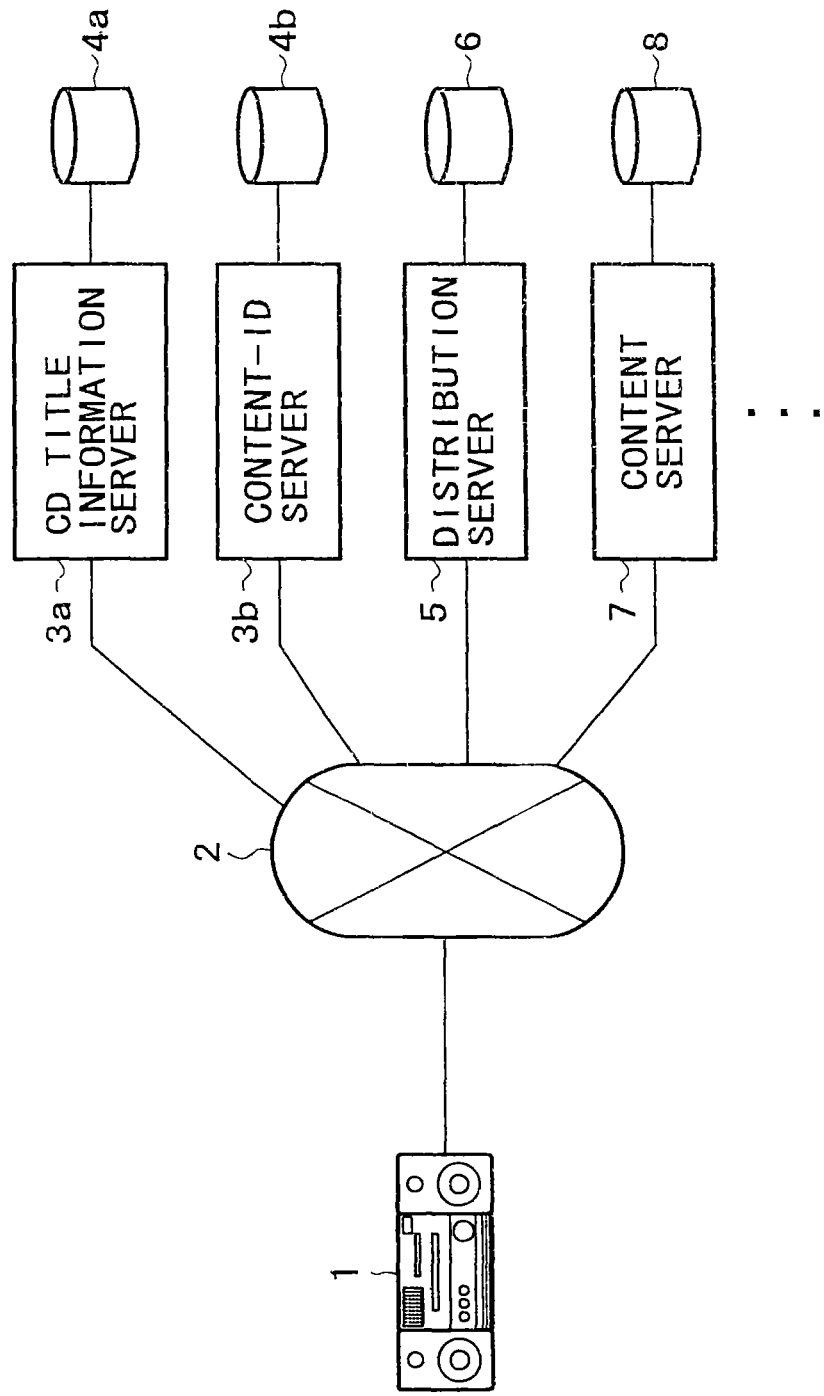
FIG. 10 is an explanatory diagram showing another typical information distribution system implemented by an embodiment of the present invention.

In order to solve this problem, a CD title information server 3*a* is used in the information distribution system implemented by this embodiment as it is and, in order to allow content IDs to be used as IDs conforming to a rule of uniformity, a conceivable content ID server 3*b* is added besides the CD title information server 3*a* as shown in FIG. 10.

In this configuration, as shown in FIG. 11*a*, the CD title information server 3*a* has a CD title information database 4*a* for storing CD-title information for each CD identifier representing the title of a generally distributed CD. The CD-title information for a CD identifier identifying a CD includes the title of the album and the name of artists for the entire CD as well as the title and composer name of each song recorded on the CD.

However, the CD-title information does not include a content ID.

As shown in FIG. 11*b*, on the other hand, the content-ID server 3*b* has a content-ID database 4*b* for storing content IDs for each CD identifier representing the title of a generally distributed CD. However, the content-ID database 4*b* does not include additional information for each content even though additional information can be stored as well.

It is to be noted that the CD title information server 3*a* and the content-ID server 3*b* can have the same configuration as the CD-information server 3 explained earlier by referring to FIG. 2.

By incorporating the content-ID server 3*b* in an information distribution system, the CD title information server 3*a* can be utilized in the system as it is to provide the same operations as those of this embodiment.

Figure 12:
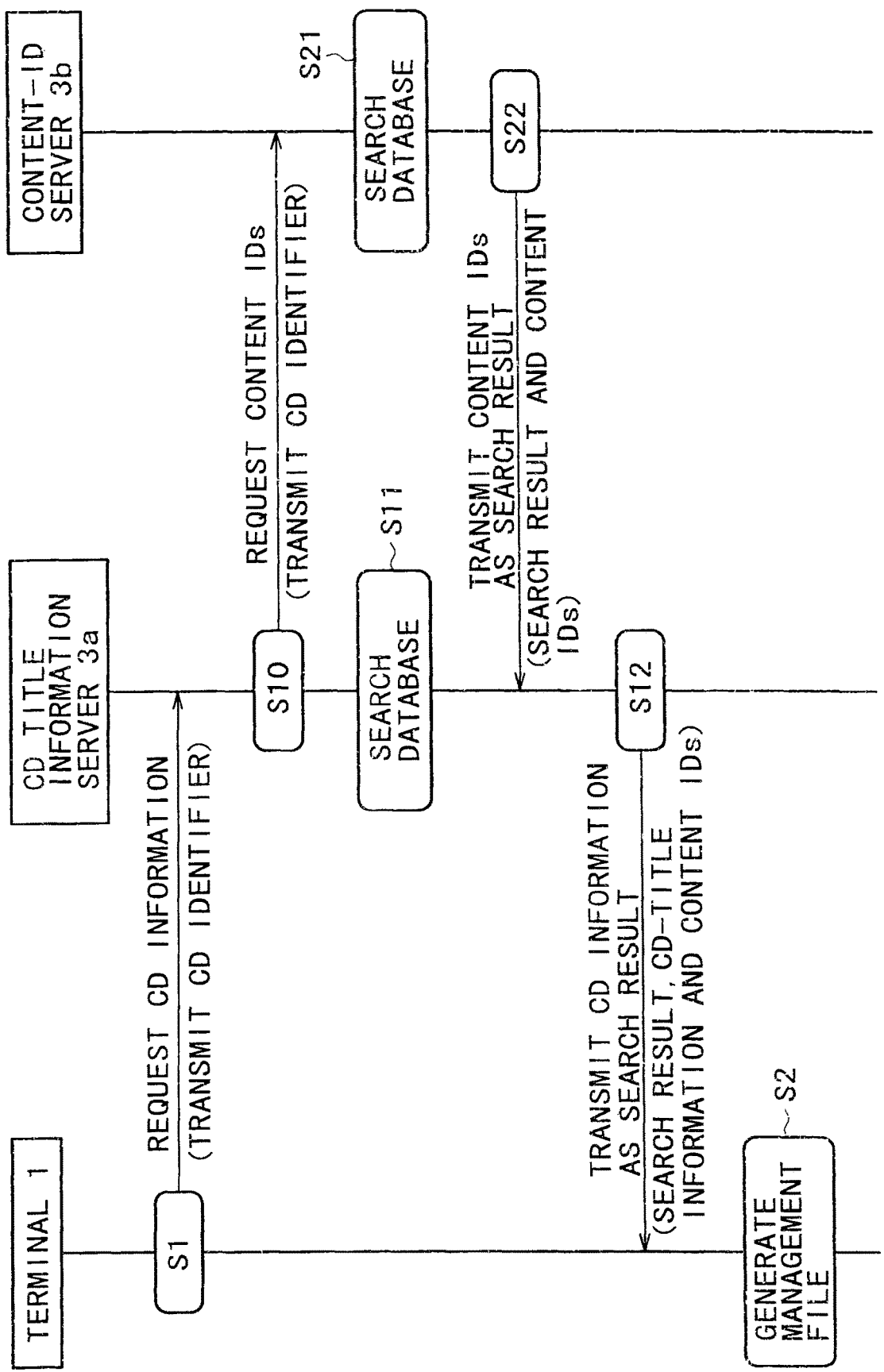
FIG. 12 is an explanatory diagram showing other communication processing to acquire CD information including a content ID in accordance with the embodiment.

For example, the process carried out by the terminal 1 to generate a management file at the step F111 of the flowchart shown in FIG. 8 is implemented as shown in FIG. 12 or 13.

First of all, typical operations shown in FIG. 12 are explained.

In a procedure S1 of this process, the CPU 21 issues a command to the communication-processing unit 32 to establish a communication with the CD title information server 3*a* through the network 2 by transmitting a request for establishment of the communication to the CD title information server 3*a*. As the communication is established, the CD identifier obtained at the step F102 is transmitted to the CD title information server 3*a* as a signal making a request for information on the CD identified by the CD identifier.

The CD title information server 3*a* also carries out a process to establish a communication in response to a request received from the terminal 1 as a request for establishment of the communication. As the request signal including the CD identifier is received from the terminal 1, the CD title information server 3*a* executes a procedure S10 to transmit a signal including the CD identifier to the content-ID server 3*b* as a request for a content ID.

In addition to the transmission of the request signal, the CD title information server 3*a* also executes a procedure S11 to search the CD title information database 4*a* like the one shown in FIG. 11A on the basis of the CD identifier for CD-title information associated with the CD identifier received from the terminal 1.

In the mean time, when the content-ID server 3*b* receives the signal including the CD identifier as a signal making a request for a content ID from the CD title information server 3*a*, the content-ID server 3*b* executes a procedure S21 to search the content-ID database 4*b* like the one shown in FIG. 11B on the basis of the CD identifier for the content ID associated with the CD identifier.

Then, the content-ID server 3*b* executes a procedure S22 to transmit the content ID as a result of the search to the CD title information server 3*a*. In actuality, the content-ID server 3*b* transmits the content IDs of all songs recorded on the CD identified by the CD identifier.

The CD title information server 3*a* then receives the content IDs from the content-ID server 3*b*. These content IDs are contents IDs of songs recorded on a CD, the CD-title information of which has been found in the search operation of the procedure S11.

Then, the CD title information server 3*a* executes a procedure S12 to transmit CD information like the one shown in FIG. 5 as results of the search operations to the terminal 1. As shown in the figure, the CD information includes the CD-title information and the content IDs.

As a result, the terminal 1 is capable of receiving the CD-title information and the content IDs and, hence, capable of generating a management file by execution of a procedure S2. As shown in FIG. 7, the management file associated with the CD identifier includes the CD-title information and the content IDs of songs recorded on the CD identified by the CD identifier. In addition, for each of the content IDs, the management file also includes content-file link information and content-source information as shown in FIG. 7. The generated management file is then written into the HDD 31.

Next, typical operations shown in FIG. 13 are explained.

In this case, in a procedure S1A, the CPU 21 establishes a communication with the CD title information server 3*a* through the network 2 by transmitting a request for establishment of the communication to the CD title information server 3*a*. As the communication is established, the CD identifier obtained at the step F102 is transmitted to the CD title information server 3*a* as a signal making a request for information on the CD identified by the CD identifier. In this case, however, the requested information on the CD includes only CD-title information and no content IDs.

The CD title information server 3*a* also carries out a process to establish a communication in response to a request received from the terminal 1 as a request for establishment of the communication. As the request signal including the CD identifier is received from the terminal 1, the CD title information server 3*a* executes a procedure S11 to search the CD title information database 4*a* like the one shown in FIG. 11A on the basis of the CD identifier for the CD-title information associated with the CD identifier received from the terminal 1.

Then, the CD title information server 3*a* executes a procedure S12 to transmit the CD-title information obtained as a result of the search to the terminal 1.

Thus, the terminal 1 is capable of receiving the album title of the ripped CD and names of songs recorded on the CD as the CD-title information.

Subsequently, in a procedure S1B, the CPU 21 establishes a communication with the content-ID server 3*b* through the network 2 by transmitting a request for establishment of the communication to the content-ID server 3*b*. As the communication is established, the CD identifier obtained at the step F102 is transmitted to the content-ID server 3*b* as a signal making a request for information on the CD identified by the CD identifier. In this case, however, the requested information on the CD includes only content IDs.

As the request signal including the CD identifier is received from the terminal 1, the content-ID server 3*b* executes a procedure S21 to search the content-ID database 4*b* like the one shown in FIG. 11B on the basis of the CD identifier for content IDs associated with the CD identifier received from the terminal 1.

As a result of the search is obtained, the content-ID server 3*b* executes a procedure S22 to transmit the result of the search to the terminal 1. The result of the search is the content IDs of all songs recorded on the CD identified by the CD identifier.

As a result of the communications described above, the terminal 1 is capable of receiving the CD-title information and the content IDs and, hence, capable of generating a management file by execution of a procedure S2. As shown in FIG. 7, the management file associated with the CD identifier includes the CD-title information and the content IDs of songs recorded on the CD identified by the CD identifier. In addition, for each of the content IDs, the management file also includes content-file link information and content-source information as shown in FIG. 7. The generated management file is then written into the HDD 31.

By carrying out communication processing like the one shown in FIG. 12 or 13, for example, the terminal 1 is capable of receiving CD-title information originated by the CD title information server 3*a* and content IDs originated by the content-ID server 3*b*.

In a system configuration like the one shown in FIG. 10, the CD title information server 3*a* (employing the CD title information database 4*a*) can thus be utilized as it is.

While the content-ID server 3*b* and the content-ID database 4*b* are each a newly constructed system element, it is not necessary to manage CD-title information as additional information by using the content-ID server 3*b* and the content-ID database 4*b*. Thus, the content-ID server 3*b* and the content-ID database 4*b* can be constructed and operated relatively with ease.

8: The Distribution Server, the Content Server and a Song List

The following description explains operations carried out by the user of the terminal 1 to download a music content through the network 2.

In this case, the terminal 1 carries out communications with the distribution server 5 and the content server 7, which are shown in FIG. 1.

The distribution server 5 is a server for executing management to distribute music contents worth charging for and charge-free contents. On the other hand, the content server 8 is a server actually managing actual music contents and distributing a music content to the terminal 1 in accordance with a command received from the distribution server 5.

The song-list database 6 managed by the distribution server 5 as shown in FIG. 1 is used for storing song lists #1, #2 . . . as shown in FIG. 14A.

A song list is a list of music contents. A song list is shown to the user to allow the user to select a content among those on the list as a content to be downloaded.

The song list data #1, #2 . . . constitutes typically each a list of music contents of the same genre or music contents sung by the same artist. The song list data can be created arbitrarily in the distribution server 5 as a list of music contents, which are recommended to the user as contents to be purchased.

A song-list data identifier is assigned to each piece of the song list data #1, #2 . . . as an identifier for managing the lists. Each piece of the song list data #1, #2 . . . includes data of a song-list title and data associated with the content ID of every music content cataloged on the list.

Figure 15:
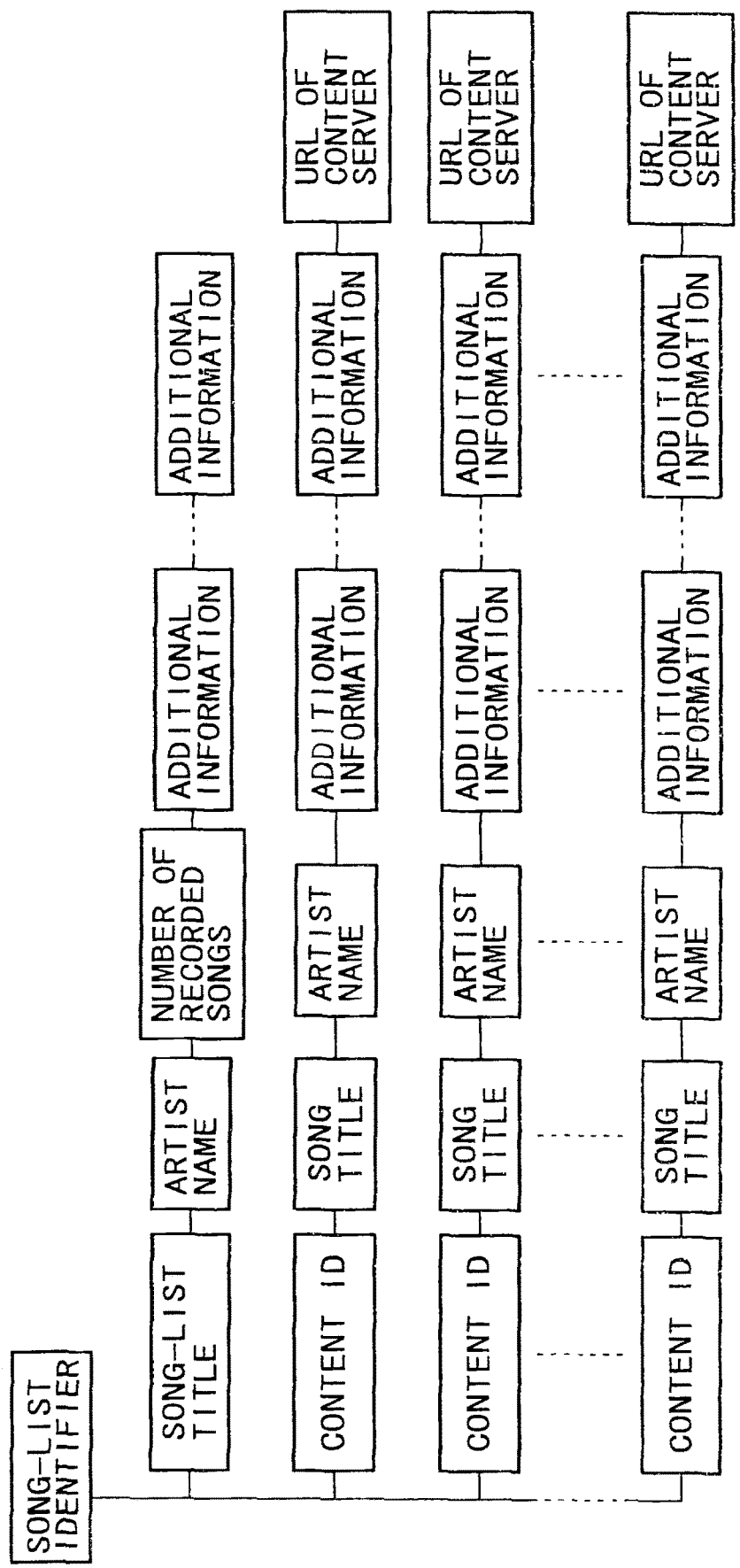
FIG. 15 is a diagram showing the structure of a song list provided by the embodiment.

FIG. 15 is a diagram showing the data structure of a piece of the song list data # x stored in the song-list database 6. As shown in the figure, a song-list identifier is assigned to the song list data, which includes information of the song-list title and data associated with the content ID of every music content cataloged on the list, corresponding to the song-list identifier.

The information of the song-list title is various kinds of additional information on the song list. A content ID is a content identifier assigned uniquely to each music content (or a song) cataloged on the song list. The content IDs are managed by the CD-information server 3 or the content-ID server 3*b* as IDs conforming to a rule of uniformity.

As shown in FIG. 15, in the first place, additional information as information of the song-list title corresponding to the whole song list is stored. The additional information of the song-list title includes the title of the song list (or the song-list title), the names of artists, the number of music contents cataloged on the song list and one piece of other additional information or a plurality of pieces of additional information having different types.

The pieces of additional information include conceivable data such as a guide of the song list, pictures for the music contents cataloged on the song list and/or the artists of the music contents, information on relevant people and information on copyrights.

In addition, content IDs of music contents cataloged on the song list are included on the song list as IDs associated with the song-list identifier. Additional information, as information of the song-list title of each song, associated with each content ID is stored. The additional information includes the song title, the name of an artist for the music content and one piece of other additional information or a plurality of pieces of additional information having different types. The pieces of other additional information for the music content include information on relevant people such as the lyrics writer, the song composer and the producer, information on a copyright, the lyrics, comments and images. In addition, the URL of a content server actually managing and distributing the content data of the song is included.

It is to be noted that, in FIG. 15, the information of the song-list title in the above description is auxiliary information other than the data of the content IDs associated with the same song-list identifier. The song-list information is a generic name representing both the data of the song-list title and the data of the content IDs.

The content database 8 managed by the content server 7 as shown in FIG. 1 is used for storing content data in a data structure shown in FIG. 14B. As shown in the figure, entries #1, #2 . . . each include a content ID and content data identified by the content ID. The content IDs in this case are managed by the CD-information server 3 or the content-ID server 3*b* as IDs conforming to a rule of uniformity.

9: Processing to Display a Song List in the Terminal

The terminal 1 displays a song list managed by the distribution server 5 as described above on the display unit 27 so as to allow the user of the terminal 1 to arbitrarily select a music content and download the selected content. In particular, if the display of a song list also includes information showing the user whether or not each of the music contents on the song list has been stored in the HDD 31 employed in the terminal 1, the user can be prevented from again mistakenly downloading a music content already owned by the user as a content stored in the HDD 31. In addition, the information indicating whether or not each of the music contents on the song list has been stored in the HDD 31 also serves as effective information for verifying music contents owned by the user.

It is to be noted that, conceivably, the terminal 1 or the distribution server 5 is capable of determining whether or not each of the music contents on the song list has been stored in the HDD 31. First of all, the following description explains an embodiment in which the terminal 1 determines whether or not each of the music contents on the song list has been stored in the HDD 31.

Figure 16:
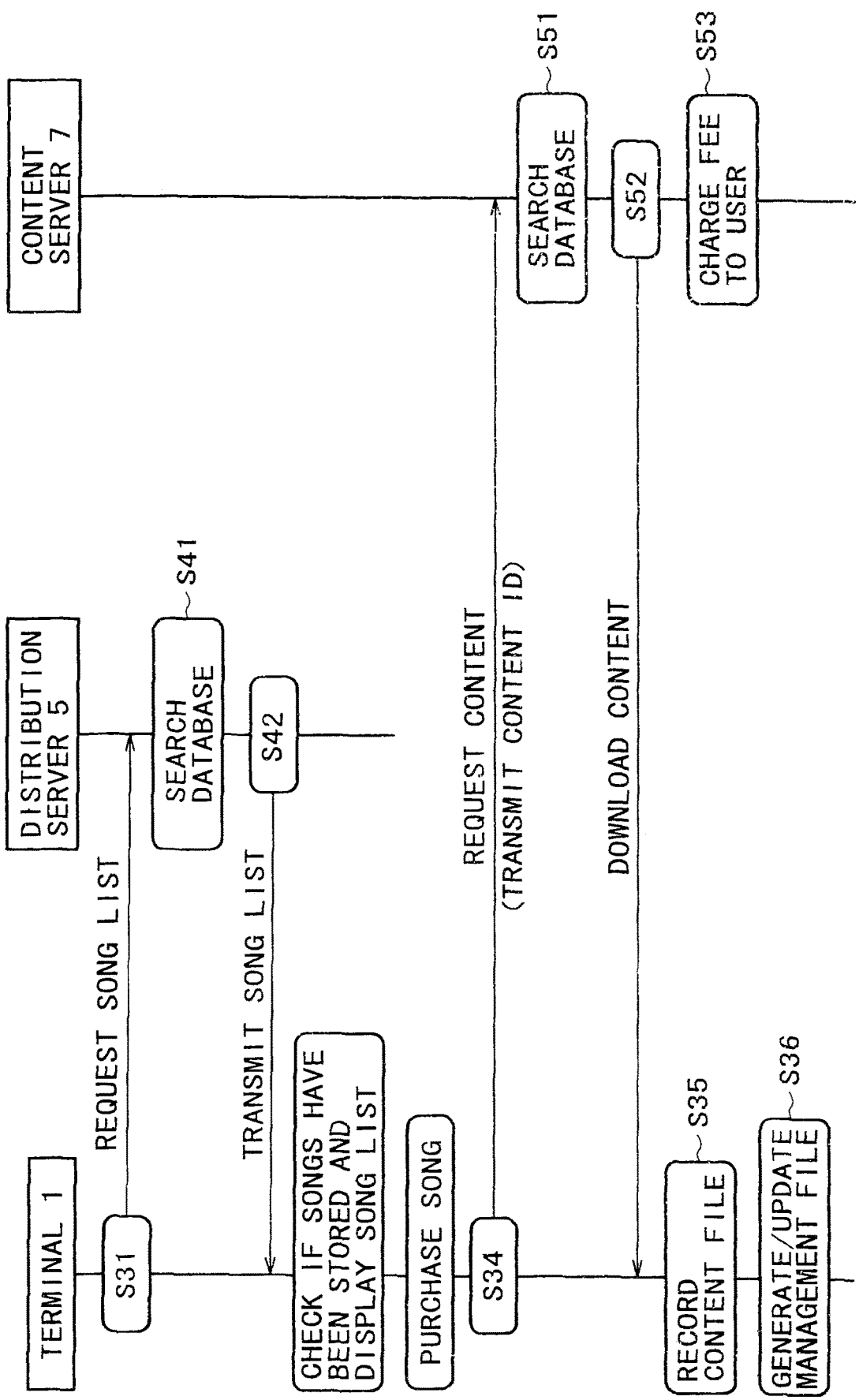
FIG. 16 is an explanatory diagram showing a display of the song list and communication processing to download a content in accordance with the embodiment.

FIG. 16 is a diagram showing flows of communication processing from an operation to make a request for a song list to an operation to download a music content on the song list. It is to be noted that the processing shown in FIG. 16 as processing of the terminal 1 is processes carried out by the communication-processing unit 32 and the database management unit 30 in accordance with control executed by the CPU 21 as implementation of operations performed by the user. In addition, the configurations of the distribution server 5 and the content server 7 are all but the same as the configuration of the CD-information server 3 explained earlier by referring to FIG. 2. That is to say, processing of the distribution server 5 is processes carried out by a communication-processing unit and a database management unit in accordance with control executed by a CPU. By the same token, processing of the content server 7 is processes carried out by a communication-processing unit and a database management unit in accordance with control executed by a CPU.

In accordance with an operation carried out by the user to display a song list, the terminal 1 executes a procedure S31 to transmit a signal to the distribution server 5 as a request for the song list.

It is to be noted that the above description has been made simple. In actuality, at the first stage, a request for a list of song lists themselves is made and the user selects a desired song list before making the above request for the song list. In this way, a list menu is conceivably divided into hierarchical list displays.

Thus, the song list requested in the procedure S31 shown in FIG. 16 is a song list selected by the user from a song-list menu received from the distribution server at the preceding stage. That is to say, this procedure represents an operation in which the CPU 21 employed in the terminal 1 transmits the song-list identifier of the selected song list to the distribution server 5 as a signal making a request for the selected song list.

When the distribution server 5 receives the signal making a request for a song list, the distribution server 5 executes a procedure S41 to search the song-list database 6 having a data structure like the one shown in FIG. 14A on the basis of the song-list identifier for a song list identified by the song-list identifier represented by the request signal. Then, the distribution server 5 executes a procedure S42 to transmit to the terminal 1 song-list information having a data structure like the one shown in FIG. 15 as a result of the search.

When the terminal 1 receives the song-list information, the terminal 1 executes a procedure S32 to examine every music content on the song list in order to determine whether or not every music content has been stored in the HDD 31 and display the song list on the display unit 27 along with an examination result indicating whether or not every music content on the song list has been stored in the HDD 31.

Figure 17:
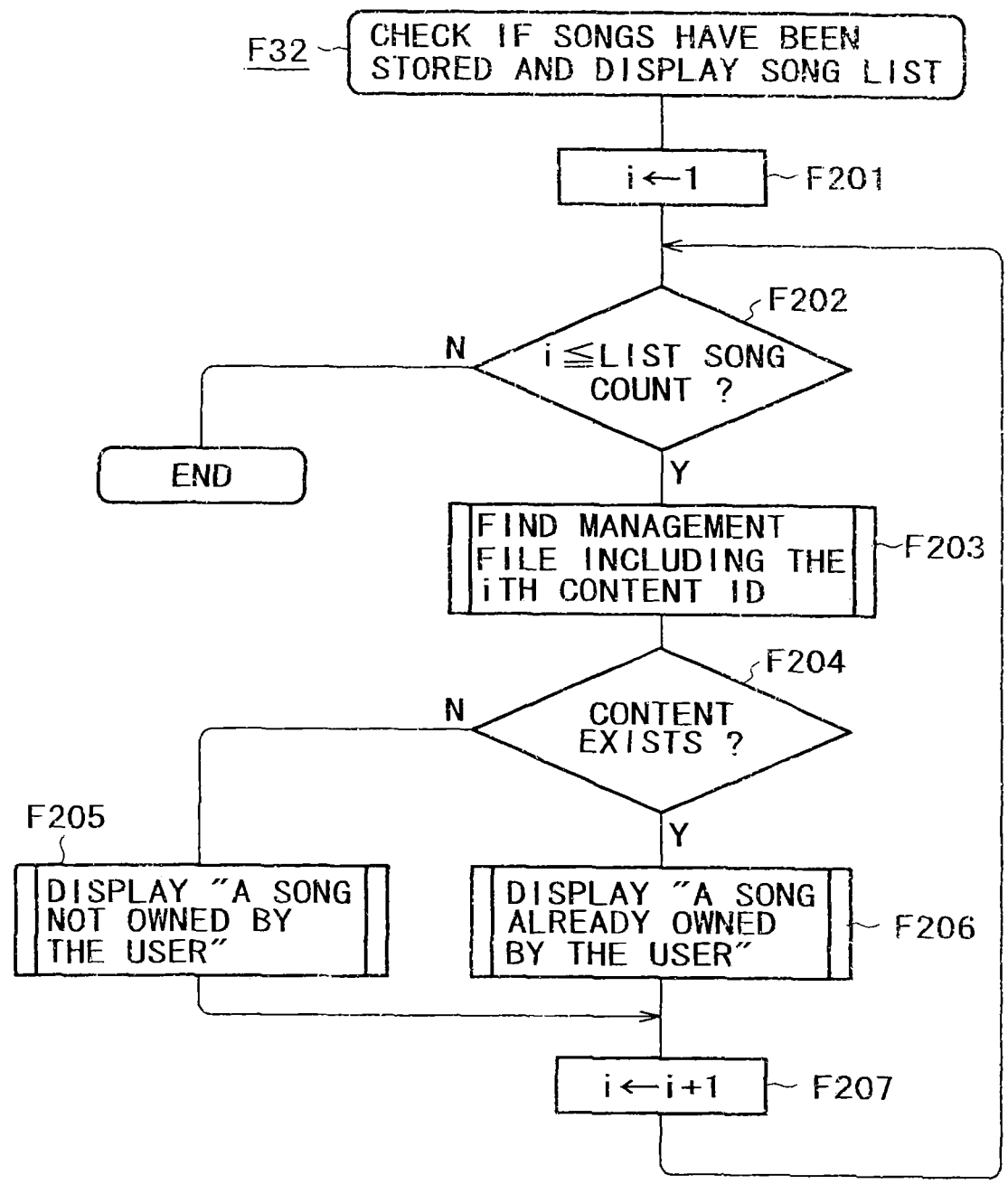
FIG. 17 shows a flowchart representing processing to display a song list on the terminal provided by the embodiment.

Processing of the procedure S32 is explained by referring to FIGS. 17 and 18.

At a step F201 of the flowchart shown in FIG. 17, the CPU 21 sets a variable i at 1. Then, at the next step F202, the variable i is examined to determine whether or not the variable i has exceeded the number of music contents on the song list.

If the variable i has not exceeded the number of music contents on the song list, the flow of the processing goes on to a step F203 at which a group of management files stored in the HDD 31 is searched on the basis of the ith CD content for a management file including the same ID content as the ith content ID on the received song list information.

It is to be noted that, as described above, the content ID of a content not stored yet in the HDD 31 may be included in a management file in some cases. For this reason, if a management file including the ith content ID on the song list information is found in the search of the management-file group, the content-file link information associated with the content ID as explained earlier by referring to FIG. 7 is referred to. A content-file link information set at 'no link' indicates that the ith content ID is the content ID of a content not stored yet in the HDD 31.

That is to say, a result of the search processing carried out at the step F203 may indicate that there is no management file including the same content ID as the ith content ID on the received song list information or may indicate that there is a management file including the same content ID as the ith content ID on the received song list information, but the content-file link information for the same content ID is set at 'no link'. In this case, the content identified by the ith content ID on the song list information is determined to be a content not stored yet in the HDD 31.

At a step F204, the result of the search processing is examined to determine whether or not the content identified by the ith content ID on the song list information has been stored in the HDD 31. If the result of the determination indicates that the content identified by the ith content ID on the song list information has not been stored in the HDD 31, the flow of the processing goes on to a step F205 at which a phrase stating: "A song not owned yet by the user" is displayed for the ith content ID.

If the result of the determination indicates that the content identified by the ith content ID on the song list information has been stored in the HDD 31, on the other hand, the flow of the processing goes on from the step F204 to a step F206 at which a phrase stating: "A song already owned by the user" is displayed for the ith content ID.

The processing described above is carried out repeatedly while incrementing the variable i at a step F207 till the determination result produced at the step F202 indicates that the variable i has exceeded the number of music contents on the song list. That is to say, the terminal 1 determines whether or not a content identified by every content ID on the song-list information like the one shown in FIG. 15 has been stored in the HDD 31.

As the processing represented by the flowchart shown in FIG. 17 is ended, a typical screen shown in FIG. 18 is displayed as a screen based on the received song-list information.

FIG. 18 is a diagram showing a typical display of song-list information. As an example, the typical display shows received song-list information with a title of "10 Selected Jazz Songs Recommended by the Store Manager of a Site."

As shown in the figure, for example, 4 song titles on the top of the song list are displayed. Remaining song titles can be displayed by scrolling the screen upward. The song list information includes the song title and the name of an artist for each song. Thus, data included in the song-list information as shown in FIG. 15 is displayed.

For each music content, 'Purchase' and 'Trial listening'-desiring icons are displayed. When the user clicks the Purchase icon, the music content associated with the icon is downloaded to the terminal 1. When the user clicks the 'Trial listening' icon on the other hand, the user is allowed to listen to some of the music content associated with the icon as a trial for, among others, a verification purpose before the content is downloaded to the terminal 1. In this case, data for the trial-listening purpose is downloaded to the terminal 1 and reproduced thereby. It is to be noted that the click operation can also be an operation to touch the screen panel and an operation to enter a number assigned to the desired music content.

Assume for example that the second and fourth music contents on the song list have been determined to be songs, the data of which has been stored in the HDD 31. In this case, the Purchase icons for the second and fourth music contents are put in an inactive state not allowing a click operation to be carried out as shown in the figure. In this way, the user can verify that it is not necessary to purchase these music contents since they have been stored in the HDD 31. In addition, by putting the Purchase icons in an inactive state, the user can be prevented from clicking the icons to mistakenly purchase the music contents for the second time.

It is to be noted that there is a number of other conceivable display configurations for indicating whether or not a music content on a song list has been stored in the HDD 31. For example, for a music content already stored in the HDD 31, a phrase stating: "Already stored in the HDD" or a message similar to the phrase can also be displayed.

As described above, for a music content already stored in the HDD 31, the Purchase icon is put in an inactive state. In some conceivable cases, however, the user wants to again download a music content even though the user knows that the music content has been stored in the HDD 31. Thus, in such cases, in addition to the displayed message stating: "Already stored in the HDD," the Purchase icon is also displayed in an active state.

As a conceivable alternative, it is not specially necessary to display a message on the screen like the one shown in FIG. 18 as a message indicating that a music content has been stored in the HDD 31. In this case, however, when the user clicks the Purchase icon for a music content already stored in the HDD 31, for example, a confirmation query typically saying: "Are you sure to again download an already stored music content?" can also be displayed on a screen for confirming execution of the process to download the music content. In this way, the user is allowed to select cancellation or execution of the process to download the music content.

By displaying a song list as described above, the user can carry out an operation to download a desired music content on the song list after confirming that the desired music content has not been stored in the HDD 31. Thus, a music content already stored in the HDD 31 can be prevented from being downloaded again only because the user forgets that the user already has the content.

When the user carries out an operation to purchase a desired music content on the song list as a procedure S33 shown in FIG. 16 after verification of the music content, the CPU 21 executes a procedure S34 to transmit a request to the content server 7 as a request for the desired content or a request to download the content to the terminal 1.

To put it concretely, for the music content desired by the user, the CPU 21 fetches the URL of the content server 7 from the song-list information and transmits the content ID of the desired content to the URL.

Receiving the signal making a request for the content, the content server 7 executes a procedure S51 to search the content database 8 like the one shown in FIG. 14B on the basis of the content ID for a music content identified by the content ID received as the request for the content. Then, the content server 7 executes a procedure S52 to download the music content found in the search to the terminal 1.

It is to be noted that, after completing the operation to download the music content, the content server 7 executes a procedure S53 to carry out a process to charge a downloading fee to the user of the terminal 1. However, this process to charge a downloading fee to the user of the terminal 1 can also be carried out by the distribution server 5.

Receiving the downloaded music content from the content server 7, the terminal 1 executes a procedure S35 to store the content into the HDD 31 as a content file.

Then, the terminal 1 executes a procedure S36 to generate a management file for the music content recorded this time or to update an existing management file for the content.

If the content ID of the downloaded music content recorded this time is found in the processing represented by the flowchart shown in FIG. 17 to be the content ID included in none of management files stored in the HDD 31, a new management file is generated for the music content.

In this case, instead of generating a management file for a CD identified by a CD identifier as described above, a management file to be managed by using the content ID is generated. Such a management file may include additional information such as the title of the song on the song list information.

It is to be noted that the content server 7 holds music contents along with their additional information. If the additional information is also downloaded to the terminal 1 along with a music content associated with the information, various kinds of additional information not included in the song-list information can also be recorded in the management file for the content ID.

If the song-list information (or data downloaded from the content data) includes the CD identifier of a CD containing the downloaded music content, the new management file can be created as a management file with a configuration associated with the CD identifier as shown in FIG. 7.

In this case, the CD identifier is transmitted to the CD-information server 3 as a request for various kinds of additional information corresponding to the CD identifier and content IDs of other music data recorded on the CD.

In addition, even if the song list or others do not include the CD identifier, the content ID can be transmitted to the CD-information server 3 as a request for a search of a database for the other information. In this case the CD-information server 3 searches the CD-information database 4 having data structures like the ones shown in FIGS. 4 and 5 on the basis of the content ID for a file containing the content ID. Then, the CD-information server 3 transmits the CD identifier identifying a CD containing the music content identified by the content ID, content IDs of other music contents recorded on the CD and additional information of the other music contents to the terminal 1 as results of the search. On the basis of these received results of the search, the terminal 1 is capable of generating a management file having the configuration shown in FIG. 7 in a process to download a desired music content as a management file identical with a management file generated in a process to rip a desired music content from a CD as described earlier.

If the content ID of a downloaded music content is determined in the processing represented by the flowchart shown in FIG. 17 to be the content ID included in a management file already stored in the HDD 31, it is not necessary to generate a new management file for the downloading process carried out this time. That is to say, it is necessary only to update the management file already stored in the HDD 31.

To put it in detail, when the downloaded music content is recorded into the HDD 31, the management file is updated by cataloging the content ID of the music content in the management file and also recording content-file link information and content-source information for the content ID in the management file. If the additional information included in the song list information and the additional information received from the content server 7 include data not included in the management file, the data may be added to the management file as additional information.

10: Processing by the Distribution Server in Song-List Transmission

In the embodiment described above, the terminal 1 determines whether or not a music content on a song list has already been stored in the HDD 31. The following description explains an embodiment in which the distribution server 5 determines whether or not a music content on a song list has already been stored in the HDD 31 employed in a terminal 1 making a request for the song list.

Figure 19:
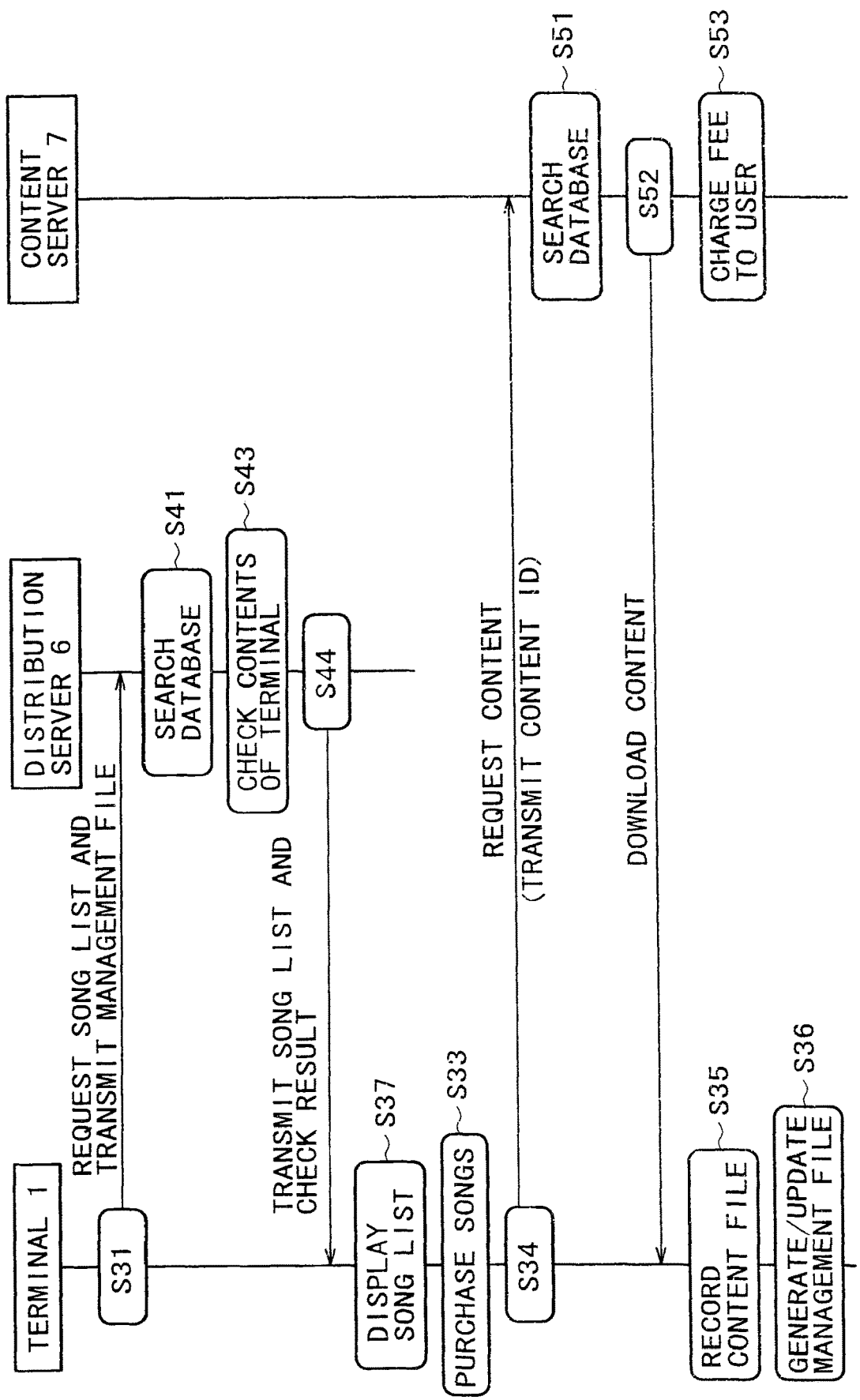
FIG. 19 is an explanatory diagram showing a display of the song list and other communication processing to download a content in accordance with an embodiment.

FIG. 19 is a diagram showing flows of communication processing from an operation to make a request for a song list to an operation to download a music content. It is to be noted that, much like the communication processing shown in FIG. 16, the processing shown in FIG. 19 as processing of the terminal 1 is processes carried out by the communication-processing unit 32 and the database management unit 30 in accordance with control executed by the CPU 21 as implementation of operations carried out by the user. In addition, the configurations of the distribution server 5 and the content server 7 are all but the same as the configuration of the CD-information server 3 explained earlier by referring to FIG. 2. That is to say, processing of the distribution server 5 is processes carried out by a communication-processing unit and a database management unit in accordance with control executed by a CPU. By the same token, processing of the content server 7 is processes carried out by a communication-processing unit and a database management unit in accordance with control executed by a CPU.

Much like the communication processing shown in FIG. 16, in accordance with an operation carried out by the user to display a song list, the terminal 1 executes a procedure S31 to transmit a signal including a song list identifier to the distribution server 5 as a request for the song list. In this case, however, the terminal 1 also transmits information included in all management files stored in the HDD 31 at the present time to the distribution server 5. The transmitted information included in all the management files includes at least all content IDs recorded in the management files. As described above, in the terminal 1 employed in a particular information distribution system, a management file may include a content ID identifying a music content not stored in the HDD 31. In such an information distribution system, the content-file link information is also transmitted to the distribution server 5. In this case, the distribution server 5 refers to the content-file link information to merely determine whether or not the information is no link.

In addition to all the content IDs, all CD identifiers may also be transmitted to the distribution server 5.

When the distribution server 5 receives the signal making a request for a song list, the distribution server 5 executes a procedure S41 to search the song-list database 6 having a data structure like the one shown in FIG. 14A on the basis of the song-list identifier for a song list identified by the song-list identifier represented by the request signal.

Then, the CPU employed in the distribution server 5 executes a procedure S43 to collate content IDs included in the song list obtained as a result of the search with all the content IDs received from the terminal 1.

Figure 20:
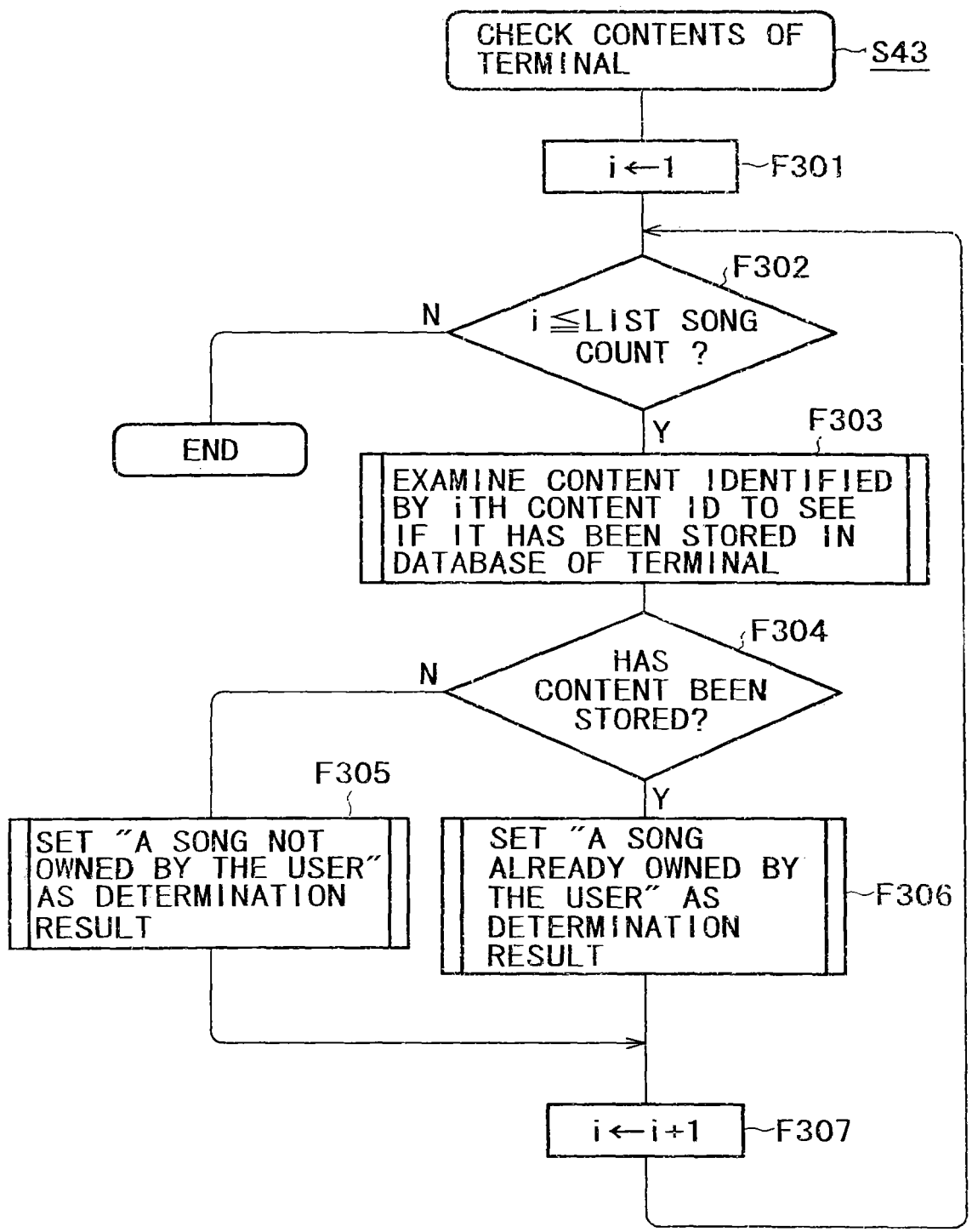
FIG. 20 shows a flowchart representing processing carried out by a distribution server of the embodiment to check contents stored in the terminal.

FIG. 20 shows a flowchart representing the process carried out by the CPU employed in the distribution server 5 to collate the content IDs. The flowchart shown in FIG. 20 begins with a step F301 at which the CPU employed in the distribution server 5 sets a variable i at 1. Then, at the next step F302, the variable i is examined to determine whether or not the variable i has exceeded the number of music contents on the song list obtained as a result of the search.

If the variable i has not exceeded the number of music contents on the song list, the flow of the processing goes on to a step F303 at which the content IDs received from the terminal 1 are searched for the same one as the ith content ID on the received song list.

It is to be noted that, as described above, the content ID of a content not stored yet in the HDD 31 may be included in a management file in some cases. For this reason, if a management file including the ith content ID on the song list information is found in the search of the management-file group, the content-file link information associated with the content ID is referred to. A content-file link information set at 'no link' indicates that the ith content ID is the content ID of a content not stored yet in the HDD 31 employed in the terminal 1.

That is to say, a result of the search processing carried out at the step F303 may indicate that there is no ID content, which is the same one as the ith content ID on the received song list information, or may indicate that there is the same ID content as the ith content ID on the received song list information, but the content-file link information for the same content ID is set at 'no link'. In this case, the content identified by the ith content ID on the song list information is determined to be a content not stored yet in the HDD 31 employed in the terminal 1.

At a step F304, the result of the search processing is examined to determine whether or not the content identified by the ith content ID on the song list information has been stored in the HDD 31 employed in the terminal 1. If the result of the determination indicates that the content identified by the ith content ID on the song list information has not been stored in the HDD 31 employed in the terminal 1, the flow of the processing goes on to a step F305 at which a phrase stating: "A song not owned yet by the user" is set for the ith content ID.

If the result of the determination indicates that the content identified by the ith content ID on the song list information has been stored in the HDD 31 employed in the terminal 1, on the other hand, the flow of the processing goes on from the step F304 to a step F306 at which a phrase stating: "A song already owned by the user" is set for the ith content ID.

The processing described above is carried out repeatedly while incrementing the variable i at a step F307 till the determination result produced at the step F302 indicates that the variable i has exceeded the number of music contents on the song list information. That is to say, the distribution server 5 determines whether or not a content identified by every content ID on the song-list information like the one shown in FIG. 15 has been stored in the HDD 31 employed in the terminal 1.

As the determination result is obtained as described above, the distribution server 5 executes a procedure S44 to transmit the song list information and the determination result to the terminal 1.

Receiving the song list and the determination result from the distribution server 5, the terminal 1 executes a procedure S37 to display the song list on the display unit 27 in a format also showing a determination result for each content ID. As shown in FIG. 18, for example, for every music content owned by the user and already stored in the HDD 31, the downloading operation is put in an inactive state. That is to say, for a music content with its determination result set at "A song already owned by the user" as described above, the downloading icon is put in an inactive state.

Of course, that there is a number of other conceivable display configurations for indicating whether or not a music content on a song list has been stored in the HDD 31. Instead of displaying the downloading icon an inactive state, for example, for a music content already stored in the HDD 31, a phrase stating: "Already stored in the HDD" or a message similar to the phrase can also be displayed.

By displaying a song list and determination results to the user in the terminal 1 as described above, the user can carry out an operation to download a desired music content on the song list after confirming that the desired music content has not been stored in the HDD 31. Thus, a music content already stored in the HDD 31 can be prevented from being downloaded again only because the user forgets that the user already has the content.

If the user carries out an operation to purchase a music content on the song list, the terminal 1 executes the procedures S33 to S36 shown in FIG. 19 and the content server 7 executes the procedures S51 to S53 shown in the same figure. Since the processing of these procedures is the same as that explained earlier by referring to FIG. 16, however, its explanation is not repeated.

11: Information Acquisition Processing Based on a Transmitted Content ID at a Reproduction Time By referring to FIG. 21, the following description explains processing, which is carried out by using a content ID when a music content recorded on a CD or stored in the HDD 31 is reproduced in the terminal 1.

In the processing, information relevant to the music content being reproduced is acquired. By displaying the acquired relevant information to the user, another service can be rendered to the user.

Figure 21:
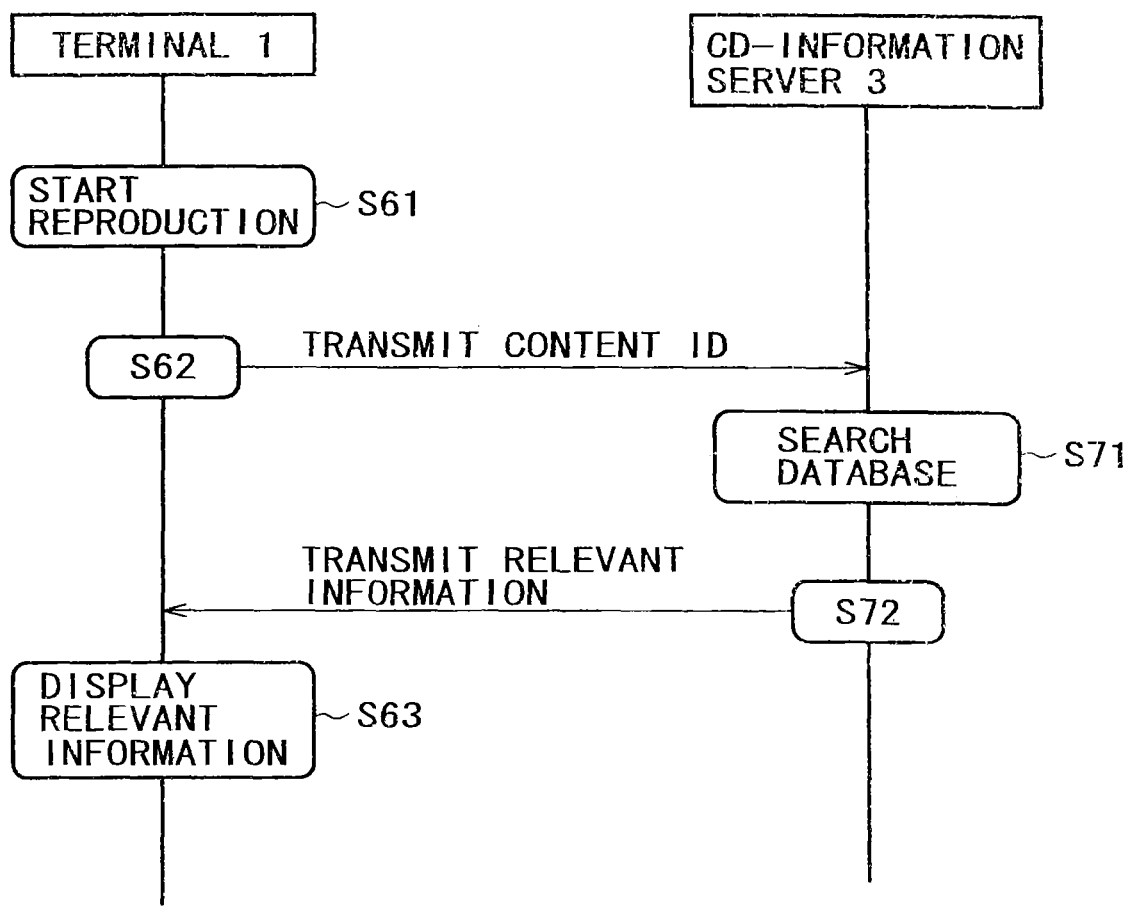
FIG. 21 is an explanatory diagram showing communication processing to acquire information relevant to a reproduced content in an embodiment.

First of all, the CPU 21 employed by the terminal 1 executes a procedure S61 shown in FIG. 21 to reproduce a music content recorded on a CD mounted on the terminal 1 or stored in the HDD 31. At that time, the content ID of the music content is acquired and a request signal for relevant information is transmitted to the CD-information server 3 by execution of a procedure S61.

Receiving the content ID as a signal making a request for relevant information from the terminal 1, the CD-information server 3 executes a procedure S71 to search the CD-information database 4 explained earlier by referring to FIGS. 4 and 5 on the basis of the content ID for additional information associated with the content ID. Then, the CD-information server 3 transmits the additional information found in the search to the terminal 1. The additional information is information relevant to the music content being reproduced in the terminal 1.

In this way, the terminal 1 is capable of obtaining information relevant to the content being reproduced. Then, the terminal 1 executes a procedure S63 to display the relevant information on the display unit 27 to the user. Thus, a content-reproducing service with a high added value can be rendered for the user.

It is to be noted that the relevant information acquired by the terminal 1 can also be added to a management file as information associated with the content ID.

The processing described above can be carried out to render an effective service of typically always providing most recent information to the user. The most recent information held by the CD-information server 3 as relevant information associated with a content ID all the time includes information on concerts conducted by the artist singing the music content, information on sales of goods relevant to the music content, information on new musical scores and information on television-broadcasted performances. By storing the relevant information in the CD-information database 4 and updating the information all the time, the information can be delivered to the user when the user reproduces the music content. Thus, this service can be rendered as an effective advertising method for promoting the sales of the CD. In addition, the relevant information may also include URLs of relevant sites such as a site for making a reservation for a concert ticket, a site for handing sales through the Internet and a site serving as a source of related data to be downloaded to the terminal 1. If the user is allowed to display the web page of a related site by carrying out an operation to click an icon appearing on the screen as an icon for the site, the user will be provided with not only an advertisement but also convenience to make a reservation for a concert ticket or buy the ticket.

12: First Processing to Acquire Information by Transmission of a Content ID at a Broadcast Reception Time By referring to FIG. 22, the following description explains processing to provide the user with various kinds of information associated with a music content received as a broadcasted sound in an operation to receive a radio broadcast or a data broadcast in the terminal 1.

The processing is carried out to acquire information relevant to a broadcasted music content in the course of an operation to listen to the content and present the information to the user so as to render another service for the user.

Figure 22:
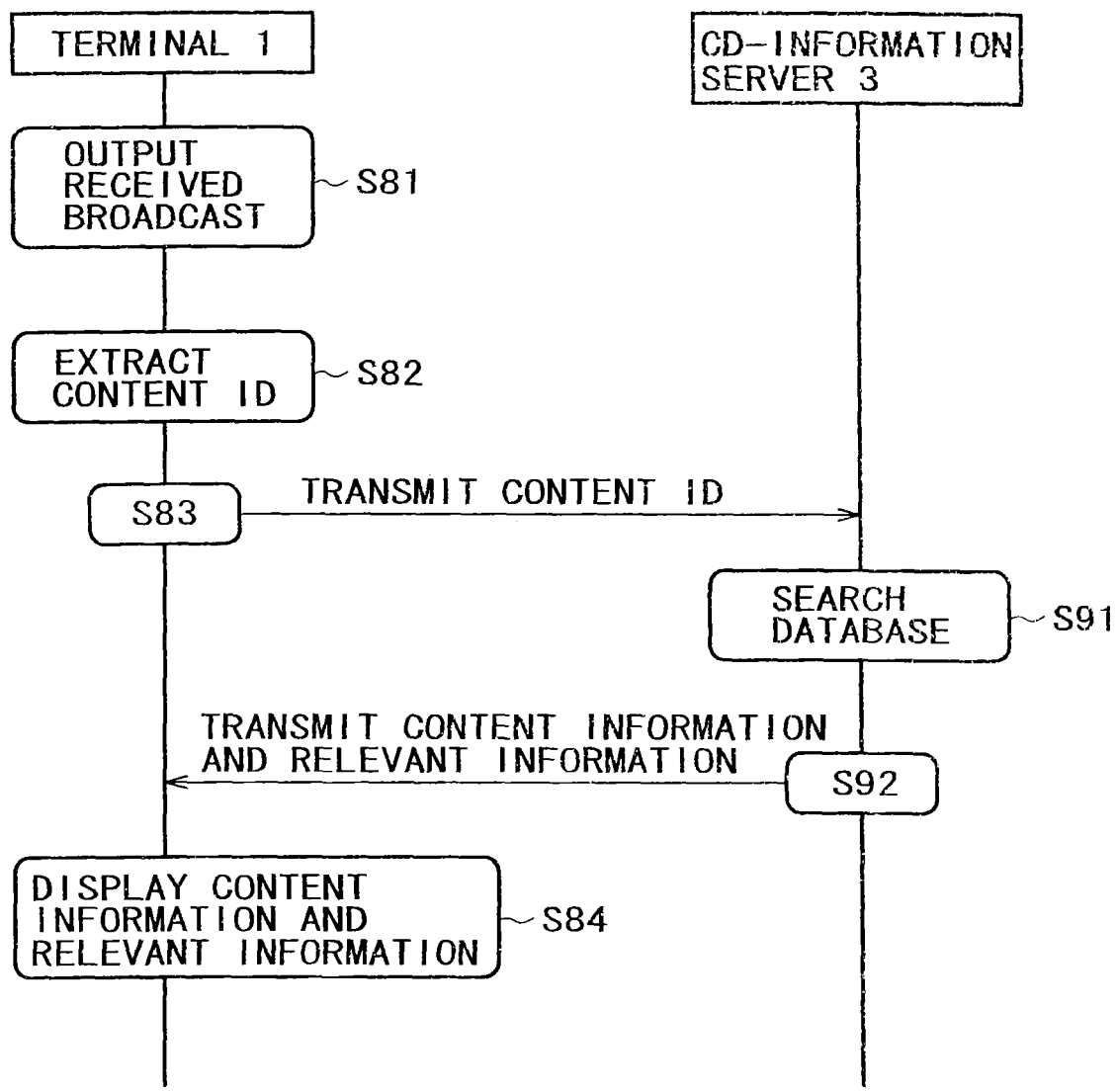
FIG. 22 is an explanatory diagram showing communication processing to acquire information relevant to a broadcast signal in an embodiment.

It is to be noted that FIG. 22 shows processing in which a broadcasting station broadcasts a broadcast signal including a content ID superposed on the signal as a signal representing a music content. That is to say, when broadcasting a music content as a signal, the broadcasting station includes data of a content ID superposed on the signal as data of the content ID of the music content. The superposed data is a content ID managed by the CD-information server 3 as an ID conforming to a rule of uniformity.

In operations carried out as a procedure S81 shown in FIG. 22, data received by the tuner 37 employed in the terminal 1 is supplied to the audio-data processor 34 before being generated as an audio output from the speaker 35.

Then, the CPU 21 executes a procedure S82 to extract a content ID from the broadcast signal being received.

Subsequently, the next procedure S83 is executed to transmit the content ID to the CD-information server 3 as a signal making a request for information relevant to the music content identified by the content ID.

Receiving the content ID as a signal making a request for the relevant information, the CD-information server 3 executes a procedure S91 to search the CD-information database 4 explained earlier by referring to FIGS. 4 and 5 on the basis of the content ID for additional information associated with the content ID. Then, the CD-information server 3 transmits the additional information found in the search to the terminal 1. The additional information is information relevant to the music content being received and output in the terminal 1.

In this way, the terminal 1 is capable of obtaining information relevant to the music content being received and output. The relevant information includes the title of the music content being received and output, the name of an artist singing the music content and other additional information. Then, the terminal 1 executes a procedure S84 to display the relevant information on the display unit 27 to the user. In this way, the user is informed of the title of the music content being received and output and the name of an artist singing the music content. Thus, a content-reproducing service with a high added value can be rendered for the user.

It is to be noted that, if the content ID extracted from the broadcasted signal matches a content ID included in a management file stored in the HDD 31, the relevant information acquired from the CD-information server 3 may also be added to the management file as additional information.

By carrying out the processing described above, the user is capable of identifying accurate information such as the title of a song as information relevant to a broadcasted music content, and the processing is also carried out to render an effective service of typically providing the user with most recent information in the same way as the typical processing explained earlier by referring to FIG. 21. That is to say, for a broadcasted music content, it is possible to provide the user with information on concerts conducted by the artist singing the music content, information on sales of goods relevant to the music content, information on new musical scores and information on television-broadcasted performances to mention a few. In addition, it is possible to provide the user with guidance information on relevant sites such as a site for making a reservation for a concert ticket, a site for handing sales through the Internet and a site serving as a source of related data to be downloaded to the terminal 1.

13: Second Processing to Acquire Information by Transmission of a Content ID at a Broadcast Reception Time By the way, in the embodiment described above, the content ID is included in a broadcast signal. Thus, the broadcasting station must cooperate with the information distribution system providing the service based on the content ID. However, relevant information similar to that described above can also be displayed even if the broadcasting station does not include the content ID in the broadcast signal.

Figure 23:
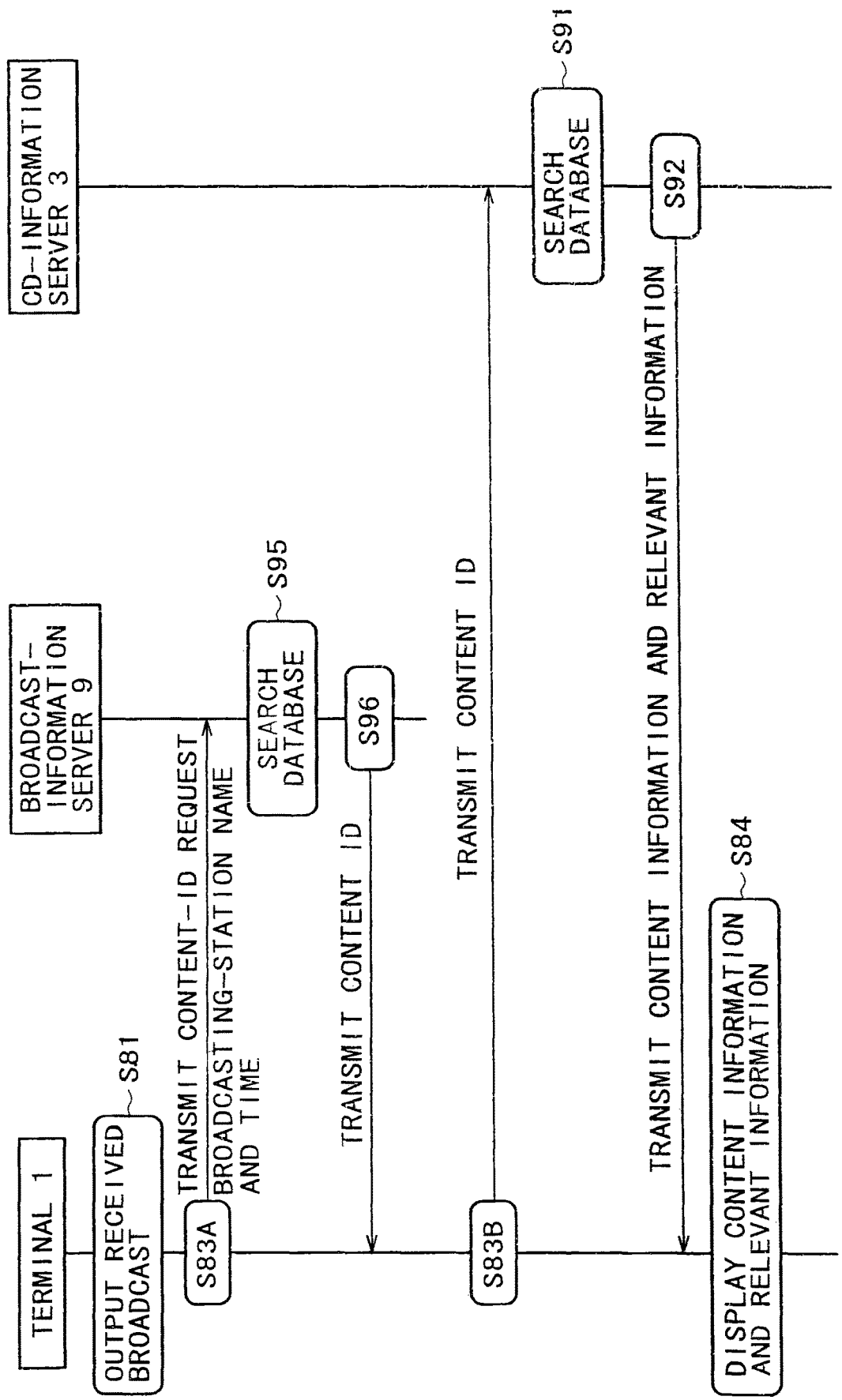
FIG. 23 is an explanatory diagram showing other communication processing to acquire information relevant to a broadcast signal in an embodiment.

Processing to display relevant information with no content ID included in the broadcast signal is explained by referring to FIG. 23.

In this processing, communications with the broadcast-information server 9 shown in FIG. 1 are carried out. The broadcast-information server 9 has a broadcast-information database 10 for storing a time table for every broadcasting station and the content ID of every broadcasted content. Every content ID is a content ID managed by the CD-information server 3 as an ID conforming to a rule of uniformity.

First of all, the terminal 1 executes a procedure S81 shown in FIG. 23 to carry out operations of supplying data received by the tuner 37 to the audio-data processor 34 to be finally generated as a sound output from the speaker 35.

Then, the CPU 21 executes a procedure S83A to transmit the name of a broadcasting station transmitting a broadcast signal representing the data being received and a broadcasting time of the signal to the broadcast-information server 9 as a request for a content ID. In place of the name of the broadcasting station, the identification of the station can be transmitted.

Receiving the request, the broadcast-information server 9 executes a procedure S95 to search the broadcast-information database 10 on the basis of the name of a broadcasting station and the broadcasting time of the signal for the content ID of a content broadcasted by the station at the broadcasting time. Then, the broadcast-information server 9 extracts the content ID found in the search from the broadcast-information database 10. Subsequently, a procedure S96 is executed to transmit the content ID obtained as a result of the search to the terminal 1.

In this way, the terminal 1 is capable of obtaining the content ID of a broadcasted music content being received. Then, the terminal 1 executes a procedure S83B to transmit the content ID to the CD-information server 3 as a signal making a request for relevant information.

Receiving the content ID as the signal making a request for relevant information, the CD-information server 3 executes a procedure S91 to search the CD-information database 4 on the basis of the content ID for additional information associated with the content ID, and extracts the information found in the search from the CD-information database 4. Then, the CD-information server 3 transmits the additional information obtained as a result of the search to the terminal 1. The additional information is information relevant to a broadcasted music content being output by the terminal 1.

In this way, the terminal 1 is capable of obtaining the song title of the music content being received, the name of the artist singing the music content and other relevant information. Then, the terminal 1 executes a procedure S84 to display these pieces of information on the display unit 27 to the user.

That is to say, even if the broadcast signal does not include a content ID, the content ID can be acquired from the broadcast-information server 9 so that the user is capable of obtaining the song title of the music content being received, the name of the artist singing the music content and other information relevant to the content.

14: Backup Services

The terminal 1 provided by this embodiment manages ripped and downloaded content files stored in the HDD 31 by using content IDs included in a management file. Since content IDs are each a unique identifier in the information distribution system shown in FIG. 1, the following backup service can be rendered.

A content downloaded by the user from the content server 7, that is, a music content purchased by the user at a price, is stored in the HDD 31. Thus, if the HDD 31 crashes or the terminal 1 itself breaks down and is replaced by a newly purchased one, the purchased music content is also lost.

Figure 24:
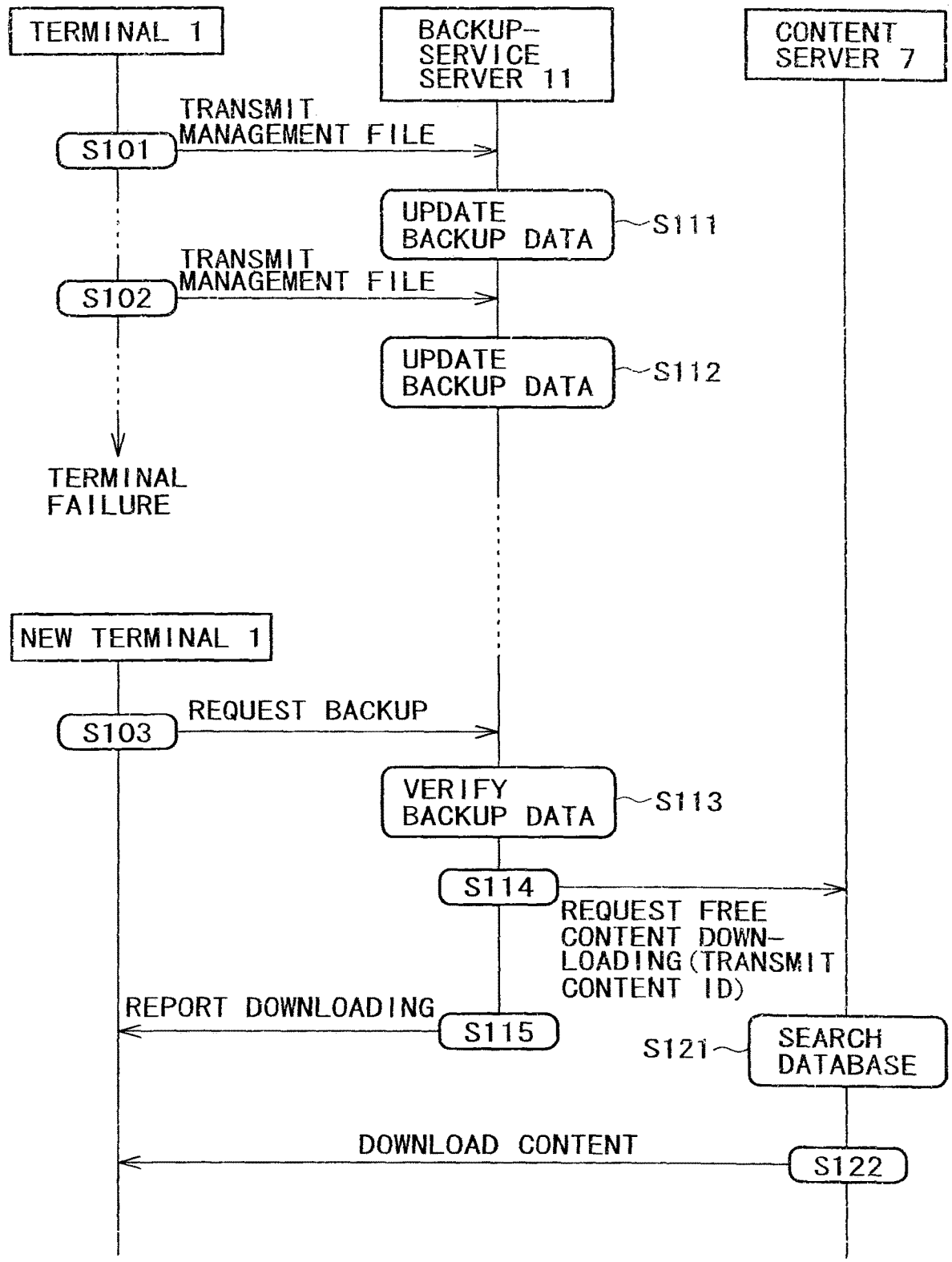
FIG. 24 is an explanatory diagram showing communication processing to render a backup service in an embodiment.

In order to cope with such a situation, a backup service for a content is rendered as shown in FIG. 24.

The CPU 21 employed in the terminal 1 carries out processing to transmit the data of a management file to the backup-service server 11 periodically or at predetermined points of time by execution of procedures S101, S102 and so on.

In this case, the data of the transmitted management file includes at least content IDs. If all content files stored in the HDD 31 are entitled to the backup service, for example, the content IDs of all the content files are transmitted to the backup-service server 11. To put it concretely, content IDs included in all management files are transmitted to the backup-service server 11 except content IDs each having content-file link information set at 'no link'.

As for a content ripped from a CD, the user should own the CD so that the content is conceivably entitled to no backup service. In this case, however, the content ID of such a content is also transmitted to the backup-service server 11 as the content ID of a downloaded content. To put it concretely, content IDs included in all management files are transmitted to the backup-service server 11 by setting the content-source information for each of the content IDs at a download site.

In addition, the data of a management file is transmitted to the backup-service server 11 periodically as described above or, as a proper alternative, right after a content file is added to the HDD 31 or right after a content file is downloaded to the terminal 1.

Every time the data of a management file or, at least content IDs included in a management file is received from the terminal 1, the backup-service server 11 stores the identification of the terminal 1 or the identification of the user and the contents of the management file in a backup database 12 by execution of procedures F111, F112 and so on.

Thus, the backup database 12 always contains information on contents held by the terminal 1 so that contents entitled to the backup service can be managed for each terminal 1.

Since the backup database 12 is used for storing only content IDs instead of actual backups of the contents themselves, it is not necessary to store an extremely large amount of backup data in the backup database 12 in order to render the backup service for a large number of terminals 1.

Assume that a terminal 1 breaks down, requiring the user to purchase a new terminal 1. In this case, the new terminal 1 executes a procedure S103 to transmit a request for a backup service to the backup-service server 11 in accordance with an operation carried out by the user or in accordance with the setting of the newly purchased terminal 1. Along with the request, information such as the identification of the user or the identification of the broken-down terminal 1 is transmitted to the backup-service server 11. As an alternative, the user enters a password or is subjected to an authentication process, or other processing is carried out so as to let the backup-service server 11 recognize the terminal change from the broken-down terminal to the new terminal.

At the request for a backup service, the backup-service server 11 executes a procedure S113 to read out content IDs stored in the backup database 12 to be used in the backup service. In this way, the backup-service server 11 is capable of recognizing contents entitled to the backup service.

Then, a procedure S114 is executed to transmit all the content IDs each serving as a target of the backup service to the content server 7, requesting the content server 7 that contents identified by the contents IDs be downloaded to the terminal 1 without charging a fee to the user. Subsequently, a procedure S115 is executed to notify the terminal 1 that contents entitled to the backup service will be downloaded from the content server 7.

The content server 7 executes a procedure S121 to search the content database 8 with a configuration like the one shown in FIG. 14B on the basis of the content IDs received from the backup-service server 11 for contents identified by the content IDs. Then, a procedure S122 is executed to download the contents found in the search to the terminal 1.

In this way, the user of the terminal 1 is allowed to acquire contents stored in the broken-down terminal 1 at no charge. That is to say, it is possible to resolve a disadvantage incurred by the user due to lost contents caused by the failure of the terminal 1.

It is to be noted that, in the actual operation, instead of downloading the contents at no charge, the contents can be downloaded at a fee lower than the normal one.

In addition, when receiving a request for a backup service, the backup-service server 11 may transmit a list of contents entitled to a backup service so as to let the user select only contents to be downloaded from those on the list. Then, the backup-service server 11 transmits only the content IDs of the selected contents to the content server 7 to inform the content server 7 that the contents identified by the content IDs are contents to be downloaded to the terminal 1.

A variety of typical configurations and typical operations has been described so far as embodiments. However, there is still a number of conceivable typical configurations of the terminal 1 and the various servers as well as conceivable typical operations that can be carried out by the terminal 1 and the various servers. In addition, there is a number of conceivable and typical configurations of the information distribution system.

Furthermore, in the embodiments, for the terminal 1 capable of reproducing a content from a CD identified by a CD identifier, data associated with the CD identifier is searched for a content ID. It is needless to say, however, that the embodiments are also applicable to other recording media such as a DVD, for which a DVD identifier is used in place of the CD identifier.

On the top of that, the scope of the present invention is not limited to music contents. For example, the present invention can also be applied to any other contents such as a moving picture, a still picture, a text and a program.

A program provided by the present invention is a program to be executed by the terminal 1 or any of the servers to carry out the operations described above. That is to say, by having an information-processing apparatus execute such a program, the apparatus is capable of functioning as any of the servers or the terminal.

In addition, a recording medium provided by the present invention as a medium for storing a program provided by the present invention as described above facilitates easy provision of the program executed to carry out the operations of any server or the terminal, which are provided by the present invention, and is suitable for construction of the information distribution system.

INDUSTRIAL APPLICABILITY

As is obvious from the above descriptions, the present invention has the following effects.

In an information distribution apparatus and an information communication terminal, which are provided by the present invention, contents are managed by using content identifiers (content IDs) managed as IDs conforming to a rule of uniformity. Particularly, contents ripped from disc recording media such as a CD mounted on the information communication terminal and stored in the terminal are each also managed by using a content identifier (content ID) acquired from the information distribution apparatus. In this way, the contents stored in the information communication terminal can be managed by using content identifiers shared as common identifiers by the information distribution apparatus.

Thus, in a communication with the information distribution apparatus, the information communication terminal is capable of identifying a content stored in storage means employed in the distribution communication terminal by using a content identifier managed as an ID conforming to a rule of uniformity. As a result, the present invention demonstrates the effect of an ability to render a variety of services such as an operation to download a content from the information distribution apparatus to the information communication terminal and an operation carried out by the information communication terminal to acquire additional information from the information distribution apparatus.

When a content is read out from a recording medium such as a CD and stored in the storage means in the information communication terminal, the information communication terminal transmits content identification information for identifying the content to the information distribution apparatus. Then, the information distribution apparatus transmits a content identifier corresponding to the content identification information to the information communication terminal. In this way, the information communication terminal is capable of obtaining a content identifier (content ID), which is managed as an ID conforming to a rule of uniformity and associated with the content. Thus, contents stored in the storage means are each put in a state of being manageable by using such a content identifier without specially requiring the user to be aware of the content identifier, that is, with the user remaining unaware of the identifier as it is. In addition, the information communication terminal is capable of obtaining various kinds of information such as CD-title information as additional information associated with the content and, by adding these pieces of information to management information, many kinds of information can be held in the information communication terminal.

On the op of that, much like a CD identifier described above, since content identification information can be generated by using information corresponding to the recording medium itself, the information distribution apparatus is capable of searching a database for content identifiers for the recording medium as well as additional information associated with the content identifiers, and transmitting the content identifiers as well as the additional information to the information communication terminal. Examples of the information corresponding to the recording medium itself are management information such as the TOC, a barcode and ISRC information. Assume for example that one music content is ripped from a recording medium such as a CD and stored in the storage means such as an HDD. Even in such a case, the information communication terminal is capable of obtaining data such as the title of the CD, the content identifiers of all contents recorded on the CD and additional information from the information distribution apparatus.

Thus, the information communication terminal is capable of displaying additional information included in management information and requesting an external information distribution apparatus to transmit relevant information in an operation to reproduce a content from not only the storage means, but also recording media such as a CD.

In addition, the management information also includes information indicating whether or not a content identified by any one of the content identifiers has been stored in the storage means so that proper management can be executed.

On the top of that, while a content list received from an external information distribution apparatus is being displayed in the information communication terminal, the management information is referenced to determine whether or not each of contents on the content list has been stored in the storage means on the basis of content identifiers. Since the display of the content list informs the user of whether or not each of contents on the content list has been stored in the storage means, the content list is a convenient tool for selecting a desired content from the content list as a content to be downloaded from the information distribution apparatus. Typically, the content list is displayed to the user to allow the user to select a content to be purchased and downloaded to the information communication terminal from the information distribution apparatus. Since the user is informed of whether or not each of contents on the content list has been stored in the storage means, the user is prevented from purchasing a content more than once.

By the same token, the information distribution apparatus is also capable of determining whether or not each of contents on a content list to be transmitted to the information communication terminal has been stored in the storage means employed in the information communication terminal on the basis of a content identifier received from the information communication terminal. The information distribution apparatus then transmits results of the determination along with the content list to the information communication terminal. By displaying the content list and the results of the determination in the information communication terminal in a format understandable to the user, the content list can be used as a tool convenient for the user in the same way as described above.

Moreover, with the management information held in the information communication terminal, since contents are managed by using content identifiers conforming to a rule of uniformity, content identifiers can be used when information relevant to the content is requested for an external information distribution apparatus. Consequently, the external information distribution apparatus can search the information thus requested by using the content identifiers and then transmits the information to the information communication terminal. By displaying the received information in the information communication terminal, it is possible to inform the user about information relevant to the reproduced contents so as to improve the information serviceability.

In addition, in the information distribution apparatus in an information distribution system, contents are managed by using content identifiers conforming to a rule of uniformity. Thus, since each information distribution apparatus is capable of searching a database for information associated with a common content identifier, it is possible to easily render services provided by a number of information distribution apparatus functioning in collaboration with each other.

As a result, the qualities of services rendered by the information communication terminal for the user can be improved.

The information communication terminal is also capable of transmitting the content identifiers of all or some of contents stored in the storage means to an external information distribution apparatus for rendering backup services. Since this information distribution apparatus saves backups of the content identifiers received from the information communication terminal, a backup service can be rendered in the event of a failure occurring in the information communication terminal.

Since a content stored in the information communication terminal can be identified from the content identifier of the content, for example, a service can be rendered to guarantee the content data itself.

In addition, the information communication terminal is also capable of extracting a content identifier from a broadcast signal received by broadcast-receiving means employed in the information communication terminal. As an alternative, the information communication terminal generates content identification information from information on a broadcasting station transmitting the broadcast signal and/or a broadcasting time. Then, the information communication terminal transmits the content identification information to an external information distribution apparatus to request the information distribution apparatus to transmit a content identifier for the broadcast signal to the information communication terminal.

Then, the information communication terminal transmits the content identifier to another external information distribution apparatus. Receiving the content identifier, the information distribution apparatus searches a database for information associated with the content identifier and transmits the information to the information communication terminal. In this way, the information communication terminal is capable of displaying the information received from the other information distribution apparatus as various kinds of information on the received broadcast. This feature is also convenient to the user.

By virtue of a program provided by the present invention and a recording medium for recording the program, information distribution apparatus and an information communication terminal, which are capable of exhibiting the effects described above, or a system including the information communication terminal and the information distribution apparatus can be implemented with ease as an information-processing apparatus.

The invention claimed is:

1. A server, comprising:
communication circuitry configured to communicate with an information processing apparatus via the Internet;
a memory; and
processing circuitry configured to, via the communication circuitry,
provide identification data of content data available for purchase to the information processing apparatus,
when the content data is purchased based on a user input for a fee, provide the purchased content data to the information processing apparatus,
receive management data including the identification data of the purchased content data stored in the information processing apparatus,
update backup data of a user identification associated with the information processing apparatus based on the management data,
receive, from the information processing apparatus, a request with the user identification associated with the information processing apparatus,
determine whether the request is authorized based on an authentication process,
provide a list of identification data of content data identified in the backup data to the information processing apparatus in response to a determination that the request is authorized,
provide the purchased content data without the fee to the information processing apparatus based on a user selection of the identification data of the purchased content data from the list of the identification data of the content data, and
send another list of identification data of content data to the information processing apparatus, wherein
the other list is displayed by the information processing apparatus with purchase icons of the content data in the other list, and
an appearance of one of the purchase icons corresponding to the purchased content data is changed to prohibit a selection of the one of the purchase icons.

2. The server according to claim 1, further comprising:
a memory configured to store the backup data of the user identification and backup data of at least one other user identification associated with another information processing apparatus.

3. The server according to claim 1, wherein the purchased content data includes one of music content, video content, an application program, and game software.

4. The server according to claim 1, wherein the processing circuitry is configured to
receive the management data including the identification data of the purchased content data from the information processing apparatus after the purchased content data is provided to and stored in the information processing apparatus.

5. The server according to claim 1, wherein the processing circuitry is configured to
provide the purchased content data without the fee when the purchased content data is no longer stored in the information processing apparatus.

6. The server according to claim 1, wherein the list of the identification data of the content data identified in the backup data includes identification data for at least one content data purchased at another information processing apparatus.

7. The server according to claim 1, wherein the list of the identification data of the content data identified in the backup data includes identification data for a plurality of previously purchased content data.

8. A server system, comprising:
communication circuitry configured to communicate with an information processing apparatus via the Internet;
a memory; and
processing circuitry configured to, via the communication circuitry,
provide identification data of content data available for purchase to the information processing apparatus,
when the content data is purchased based on a user input for a fee, provide the purchased content data to the information processing apparatus,
receive management data including the identification data of the purchased content data stored in the information processing apparatus,
update backup data of a user identification associated with the information processing apparatus based on the management data,
receive, from the information processing apparatus, a request with the user identification associated with the information processing apparatus,
determine whether the request is authorized based on an authentication process,
provide a list of identification data of content data identified in the backup data to the information processing apparatus in response to a determination that the request is authorized,
provide the purchased content data without the fee to the information processing apparatus based on a user selection of the identification data of the purchased content data from the list of the identification data of the content data, and
send another list of identification data of content data to the information processing apparatus, wherein
the other list is displayed by the information processing apparatus with purchase icons of the content data in the other list, and
an appearance of one of the purchase icons corresponding to the purchased content data is changed to prohibit a selection of the one of the purchase icons.

9. The server system according to claim 8, further comprising:
a memory configured to store the backup data of the user identification and backup data of at least one other user identification associated with another information processing apparatus.

10. The server system according to claim 8, wherein the purchased content data includes one of music content, video content, an application program, and game software.

11. The server system according to claim 8, wherein the processing circuitry is configured to
receive the management data including the identification data of the purchased content data from the information processing apparatus after the purchased content data is provided to and stored in the information processing apparatus.

12. The server system according to claim 8, wherein the processing circuitry is configured to provide the purchased content data without the fee to the information processing apparatus when the purchased content data is no longer stored in the information processing apparatus.

13. The server system according to claim 8, wherein the list of the identification data of the content data identified in the backup data includes identification data for at least one content data purchased at another information processing apparatus.

14. The server system according to claim 8, wherein the list of the identification data of the content data identified in the backup data includes identification data for a plurality of previously purchased content data.

15. A method for providing purchased content, the method comprising:

providing identification data of content data available for purchase to an information processing apparatus;

when the content data is purchased based on a user input for a fee, providing the purchased content data to an information processing apparatus;

receiving management data including the identification data of the purchased content data stored in the information processing apparatus, updating backup data of a user identification associated with the information processing apparatus based on the management data, receiving, from the information processing apparatus, a request with the user identification associated with the information processing apparatus, determining whether the request is authorized based on an authentication process, providing, by processing circuitry, a list of identification data of content data identified in the backup data to the information processing apparatus in response to a determination that the request is authorized, providing, by the processing circuitry, the purchased content data without the fee to the information processing apparatus based on a user selection of the identification data of the purchased content data from the list of the identification data of the content data, and sending another list of identification data of content data to the information processing apparatus, wherein the other list is displayed by the information processing apparatus with purchase icons of the content data in the other list, and an appearance of one of the purchase icons corresponding to the purchased content data is changed to prohibit a selection of the one of the purchase icons.

16. The method according to claim 15, wherein the purchased content data includes one of music content, video content, an application program, and game software.

17. The method according to claim 15, wherein the receiving the management data comprises:

receiving the management data including the identification data of the purchased content data from the information processing apparatus after the purchased content data is provided to and stored in the information processing apparatus.

18. The method according to claim 15, wherein the purchased content data is provided without the fee to the information processing apparatus when the purchased content data is no longer stored in the information processing apparatus.

19. The method according to claim 15, wherein the list of the identification data of the content data identified in the backup data includes identification data for at least one content data purchased at another information processing apparatus.

20. The method according to claim 15, wherein the list of the identification data of the content data identified in the backup data includes identification data for a plurality of previously purchased content data.

* * * * *